(12) United States Patent
Hulstein et al.

(10) Patent No.: US 11,085,502 B2
(45) Date of Patent: Aug. 10, 2021

(54) BLEED NEEDLE FOR A HYDRAULIC SYSTEM

(71) Applicant: QA1 Precision Products, Inc., Lakeville, MN (US)

(72) Inventors: Andrew J. Hulstein, Apple Valley, MN (US); Charles C. Olson, Cannon Falls, MN (US); Marshall J. Fegers, Savage, MN (US)

(73) Assignee: QA1 Precision Products, Inc., Lakeville, MN (US)

( * ) Notice: Subject to any disclaimer, the term of this patent is extended or adjusted under 35 U.S.C. 154(b) by 134 days.

(21) Appl. No.: 16/115,275

(22) Filed: Aug. 28, 2018

(65) Prior Publication Data

US 2019/0136936 A1    May 9, 2019

Related U.S. Application Data

(60) Provisional application No. 62/551,125, filed on Aug. 28, 2017.

(51) Int. Cl.
| | | |
|---|---|---|
| *F16F 9/342* | (2006.01) | |
| *F16K 31/383* | (2006.01) | |
| *F16K 1/52* | (2006.01) | |
| *F16K 1/38* | (2006.01) | |
| *F16F 9/44* | (2006.01) | |
| *F16F 9/34* | (2006.01) | |

(52) U.S. Cl.
CPC ............... *F16F 9/342* (2013.01); *F16F 9/34* (2013.01); *F16F 9/446* (2013.01); *F16K 1/385* (2013.01); *F16K 1/52* (2013.01); *F16K 31/383* (2013.01)

(58) Field of Classification Search
CPC .... F16F 9/342; F16F 9/31; F16F 9/446; F16F 9/06; F16F 9/34; F16K 1/52; F16K 31/383; F16K 1/385; F16K 21/185
USPC ....... 188/313, 284, 275, 297, 310, 314, 318, 188/322.2, 322.13; 267/64.13, 64.15; 251/26, 343; 137/381; D23/233, 235, D23/241, 249, 237, 247, 248
See application file for complete search history.

(56) References Cited

U.S. PATENT DOCUMENTS

| | | |
|---|---|---|
| 1,675,728 A | 7/1928 | Pierce, Jr. |
| 1,903,377 A | 4/1933 | Moorhouse |
| 2,624,645 A | 1/1953 | Virtue |
| 2,648,578 A | 8/1953 | Stearns et al. |
| 2,672,952 A | 3/1954 | Smith |
| D175,538 S | 9/1955 | Dawson |
| 2,758,365 A | 8/1956 | Ricefield |
| 2,767,034 A | 10/1956 | McCloskey |
| D189,534 S | 1/1961 | Boldt |
| D191,191 S | 8/1961 | Kawolics |

(Continued)

FOREIGN PATENT DOCUMENTS

| | | |
|---|---|---|
| JP | 3821463 B2 | 9/2006 |
| WO | 2016088536 A1 | 6/2016 |

(Continued)

*Primary Examiner* — Pamela Rodriguez
(74) *Attorney, Agent, or Firm* — Merchant & Gould P.C.

(57) ABSTRACT

A valve includes a body that has a longitudinal axis. The body includes a conical portion positioned at an end of the body. The conical portion at least partially surrounds the body. The body includes a planar face circumferentially adjacent the conical portion. The planar face is angled with respect to the longitudinal axis of the body.

30 Claims, 18 Drawing Sheets

(56) References Cited

U.S. PATENT DOCUMENTS

| | | | |
|---|---|---|---|
| 3,127,664 A | 4/1964 | Zurick | |
| 3,140,130 A | 7/1964 | Barr | |
| 3,179,477 A | 4/1965 | Carter | |
| 3,225,420 A | 12/1965 | Sullivan, Jr. | |
| 3,499,201 A | 3/1970 | Roos | |
| 3,546,762 A | 12/1970 | Martin | |
| 3,586,396 A | 6/1971 | Barr | |
| 3,592,519 A | 7/1971 | Martin | |
| 3,623,781 A | 11/1971 | Roos | |
| 3,666,331 A | 5/1972 | Curtis et al. | |
| 3,709,573 A | 1/1973 | Orkin et al. | |
| 3,834,772 A | 9/1974 | Bowen | |
| 3,871,093 A | 3/1975 | Ladin | |
| 3,884,406 A | 5/1975 | Bowen | |
| 3,909,084 A | 9/1975 | Snidar et al. | |
| 3,988,818 A | 11/1976 | Allison | |
| 3,999,872 A | 12/1976 | Allison | |
| 4,028,784 A | 6/1977 | Allison | |
| 4,057,355 A | 11/1977 | Allison | |
| 4,059,361 A | 11/1977 | Allison | |
| 4,153,237 A * | 5/1979 | Supalla | B60G 17/04 188/266.8 |
| 4,154,270 A | 5/1979 | Holmes | |
| 4,240,682 A | 12/1980 | Benson | |
| 4,298,102 A | 11/1981 | Nishikawa et al. | |
| 4,412,372 A | 11/1983 | Olschewski et al. | |
| 4,541,157 A | 9/1985 | Tsushima et al. | |
| 4,643,595 A | 2/1987 | Weavers | |
| 4,684,267 A | 8/1987 | Fetouh | |
| 4,732,244 A | 3/1988 | Verkuylen | |
| 4,821,386 A | 4/1989 | Simon et al. | |
| 4,834,140 A | 5/1989 | Schmidt | |
| 4,860,419 A | 8/1989 | Hekman | |
| 4,884,900 A | 12/1989 | Pirault et al. | |
| 5,208,979 A | 5/1993 | Schmidt | |
| 5,423,615 A | 6/1995 | Hara et al. | |
| 5,460,355 A | 10/1995 | Danek | |
| 5,536,089 A | 7/1996 | Weber et al. | |
| 5,551,782 A | 9/1996 | Arnhold et al. | |
| 5,711,074 A | 1/1998 | Harimoto et al. | |
| 5,733,049 A | 3/1998 | Shimmell | |
| 5,735,048 A | 4/1998 | Peters | |
| 5,775,817 A | 7/1998 | Gottemoller et al. | |
| 6,105,740 A | 8/2000 | Marzocchi et al. | |
| 6,146,471 A | 11/2000 | Hartl et al. | |
| 6,217,222 B1 | 4/2001 | Mattson et al. | |
| 6,287,011 B1 | 9/2001 | Hartl et al. | |
| 6,334,517 B1 * | 1/2002 | De Frenne | F16F 9/3242 188/285 |
| 6,609,299 B2 | 8/2003 | Adachi | |
| 6,659,241 B2 | 12/2003 | Sendrea | |
| 6,961,997 B2 | 11/2005 | Kubota et al. | |
| 7,484,603 B2 | 2/2009 | Fox | |
| 7,743,896 B2 | 6/2010 | Vanhees et al. | |
| 7,766,138 B2 | 8/2010 | Sintorn | |
| D628,679 S | 12/2010 | Holmgren | |
| 7,946,163 B2 | 5/2011 | Gartner | |
| D644,085 S | 8/2011 | Jungen | |
| 8,251,590 B2 | 8/2012 | Gibby et al. | |
| D670,307 S | 11/2012 | Shimozaki | |
| 8,403,115 B2 | 3/2013 | Gartner | |
| 8,528,876 B2 | 9/2013 | Straatman et al. | |
| 8,561,714 B2 | 10/2013 | Storm et al. | |
| 8,564,390 B1 | 10/2013 | McDannald | |
| 8,695,765 B2 | 4/2014 | Danek et al. | |
| 8,721,184 B2 | 5/2014 | Voisine et al. | |
| 8,770,594 B2 | 7/2014 | Tominaga et al. | |
| 8,800,973 B2 | 8/2014 | Pelot | |
| 8,807,302 B2 | 8/2014 | Nygren et al. | |
| 8,807,542 B2 | 8/2014 | Galasso et al. | |
| 8,819,939 B2 | 9/2014 | Pohlman et al. | |
| 8,838,335 B2 | 9/2014 | Galasso et al. | |
| D720,198 S | 12/2014 | Sabbag et al. | |
| 8,925,933 B2 | 1/2015 | Haugen | |
| 8,955,654 B2 | 2/2015 | Nygren et al. | |
| 9,010,504 B2 | 4/2015 | Janes | |
| 9,027,719 B2 | 5/2015 | Ito | |
| 9,038,791 B2 | 5/2015 | Marking | |
| 9,091,319 B2 | 7/2015 | Ishii et al. | |
| 9,091,320 B1 | 7/2015 | Smith et al. | |
| 9,103,401 B2 | 8/2015 | Fox | |
| D747,641 S | 1/2016 | Reynolds | |
| 9,228,630 B2 | 1/2016 | Coaplen | |
| 9,261,160 B2 | 2/2016 | Lee et al. | |
| 9,303,712 B2 | 4/2016 | Cox | |
| 9,333,829 B2 | 5/2016 | King et al. | |
| 9,341,226 B2 | 5/2016 | Marking | |
| D762,098 S | 7/2016 | Bertani | |
| 9,447,835 B2 | 9/2016 | Kim | |
| 9,528,565 B2 | 12/2016 | Marking | |
| 9,695,900 B2 | 7/2017 | Roessle et al. | |
| D796,293 S | 9/2017 | Alliss | |
| 9,816,578 B2 | 11/2017 | Galasso et al. | |
| D813,639 S | 3/2018 | Osanai | |
| 10,132,246 B2 | 11/2018 | Lior et al. | |
| D841,779 S | 2/2019 | Penkkimaki | |
| D869,259 S * | 12/2019 | Hulstein | D8/307 |
| D872,837 S * | 1/2020 | Hulstein | D23/249 |
| 2005/0121642 A1 | 6/2005 | Purdy | |
| 2005/0145466 A1 | 7/2005 | Wang | |
| 2006/0104559 A1 | 5/2006 | Wingett et al. | |
| 2007/0269150 A1 | 11/2007 | Guilford | |
| 2009/0277166 A1 | 11/2009 | Walz | |
| 2012/0325046 A1 | 12/2012 | Luchner et al. | |
| 2013/0084035 A1 | 4/2013 | Williams et al. | |
| 2013/0228404 A1 | 9/2013 | Marking | |
| 2015/0290991 A1 | 10/2015 | Cox | |
| 2015/0323035 A1 * | 11/2015 | Coaplen | F16F 9/44 188/269 |
| 2015/0375787 A1 | 12/2015 | Adachi | |
| 2016/0031285 A1 | 2/2016 | Tucker et al. | |
| 2016/0075204 A1 | 3/2016 | Marking et al. | |
| 2016/0319897 A1 | 11/2016 | Mochizuki et al. | |
| 2016/0363184 A1 | 12/2016 | Noguchi et al. | |
| 2017/0167562 A1 | 6/2017 | King et al. | |
| 2018/0119768 A1 | 5/2018 | Cox | |
| 2018/0202576 A1 | 7/2018 | Mouton et al. | |

FOREIGN PATENT DOCUMENTS

| | | |
|---|---|---|
| WO | 2016088629 A1 | 6/2016 |
| WO | 2016151015 A1 | 9/2016 |

* cited by examiner

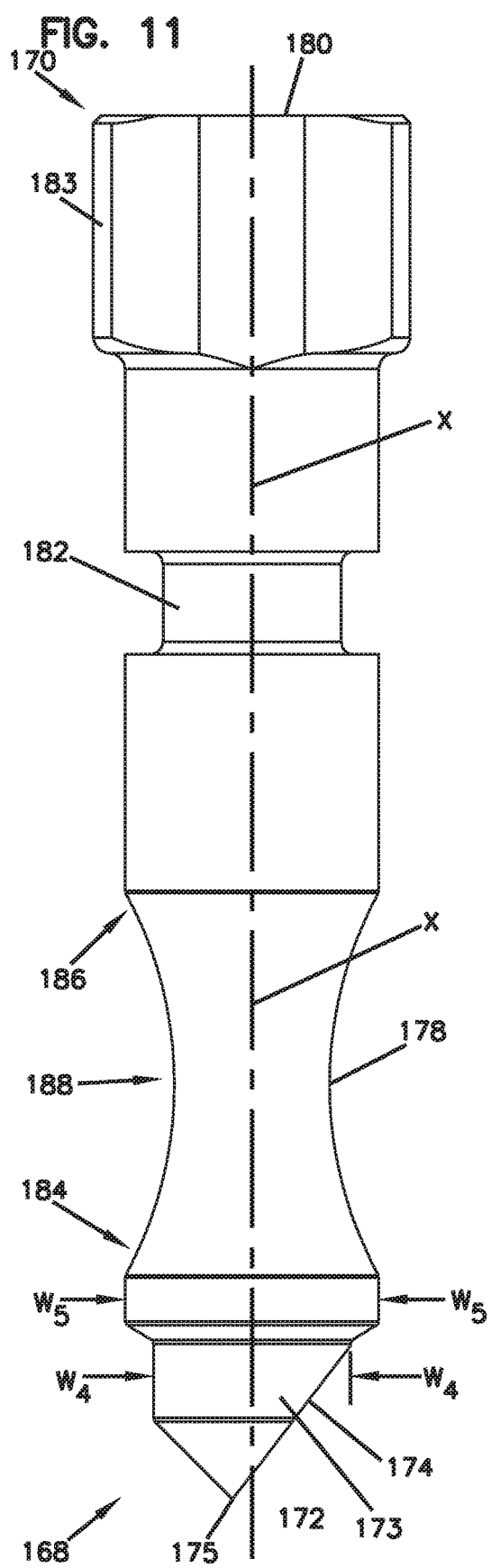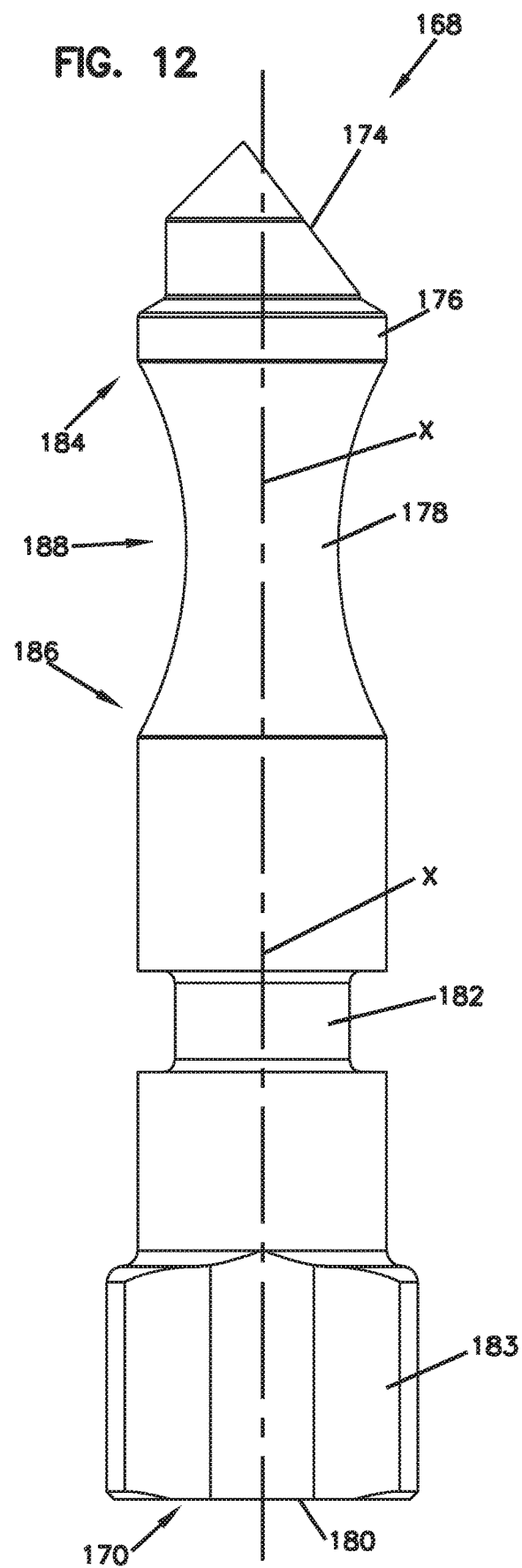

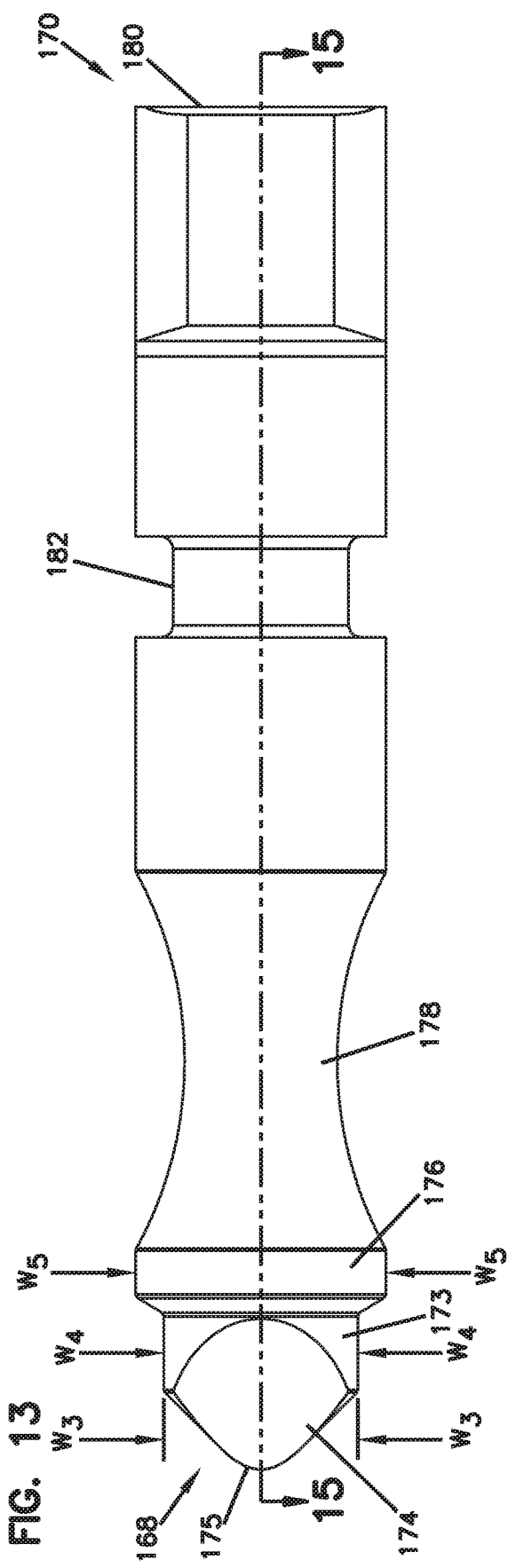
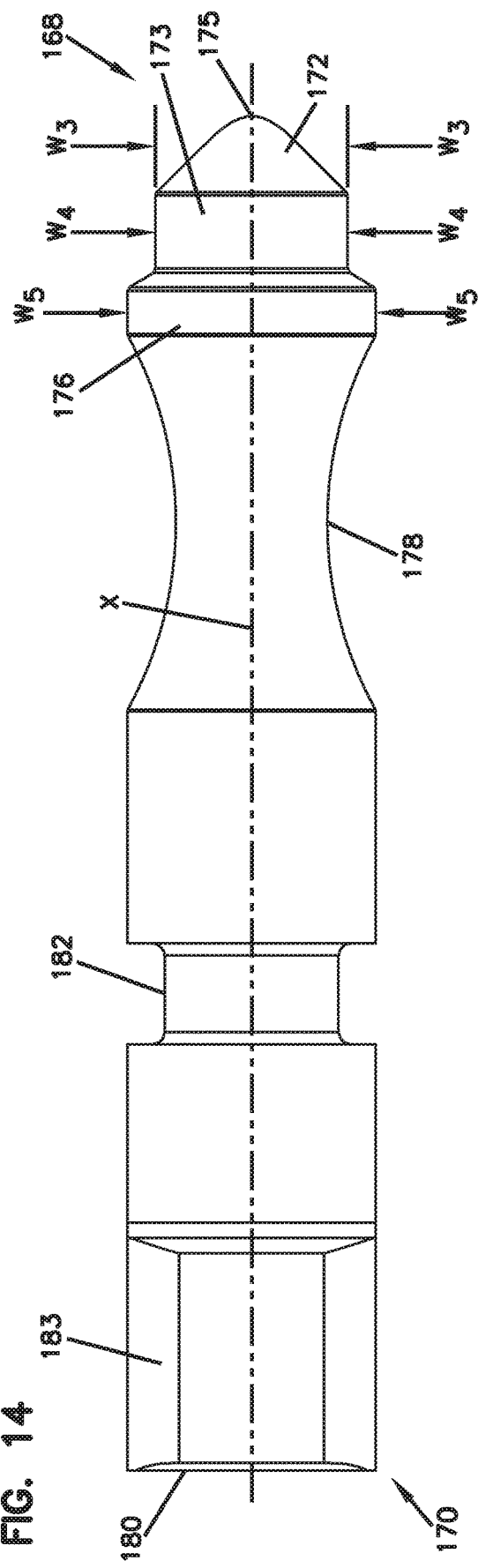

BLEED NEEDLE FOR A HYDRAULIC SYSTEM

CROSS-REFERENCE TO RELATED APPLICATION

This application claims benefit of U.S. Provisional Patent Application No. 62/551,125, filed Aug. 28, 2017, which application is hereby incorporated by reference in its entirety.

BACKGROUND

Bleed valves are used in a variety of different fluid systems to meter flow between fluid passages. In some systems, a bleed needle is used that includes a specifically designed tip over which fluid flows between passages. Specifically, the position of the bleed needle can be adjusted to achieve desired flow between passages. However, predictable fluid flow behavior is desired when adjusting the bleed needle.

In some fluid applications, such as shock absorbers, the tip of the bleed needle must be carefully machined and inspected to ensure proper operation once installed into the shock absorber. If not properly machined, the increments of adjustment force in metered flow between passages can be non-linear and inconsistent despite a linear adjustment of the bleed valve by the user. Improper machining of a bleed valve needle can create this exponential or inconsistent change in force adjustments between a fully closed position and a fully open position. However, properly inspecting the tip of a bleed needle often requires specialty machinery and can be time consuming.

Therefore, improvements in bleed needles are needed.

SUMMARY

The present disclosure relates generally to a low speed valve (e.g. a bleed needle). In one possible configuration, and by non-limiting example, the bleed needle includes a tip having a conical portion and a planar portion.

In one example of the present disclosure, a valve is disclosed. The valve includes a body that has a longitudinal axis. The body includes a conical portion positioned at an end of the body. The conical portion at least partially surrounds the body. The body includes a planar face circumferentially adjacent the conical portion. The planar face is angled with respect to the longitudinal axis of the body.

In another example of the present disclosure, a valve is disclosed. The valve includes a body that has a longitudinal axis. The body includes a circumferential shoulder with an outer diameter that is defined by the body. The body includes a conical portion at least partially surrounding the body and axially adjacent the shoulder. The conical portion at least partially defines a valve body tip. The conical portion has a maximum outer diameter less than or equal to the outer diameter of the shoulder. The body includes a planar face circumferentially adjacent the conical portion and axially adjacent the shoulder. The planar face is angled with respect to a longitudinal axis of the body. The planar face at least partially defines the valve body tip.

In another example of the present disclosure, a valve system for a shock absorber is disclosed. The valve system includes a valve chamber body that includes a valve chamber for receiving a valve. The valve chamber connects a first passage and a return passage. The valve includes a body that has a longitudinal axis. The valve body includes a conical portion positioned at a first end of the body. The conical portion at least partially surrounds the body. The body includes a planar face circumferentially adjacent the conical portion. The planar face is angled with respect to the longitudinal axis of the body. The position of the valve within the valve chamber controls the flow of fluid between the first and return passages via the valve chamber.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 11 illustrates a top view of the low speed valve body of FIG. 8.

FIG. 12 illustrates a bottom view of the low speed valve body of FIG. 8.

FIG. 13 illustrates a side view of the low speed valve body of FIG. 8.

FIG. 14 illustrates another side view of the low speed valve body of FIG. 8.

DETAILED DESCRIPTION

Figure 1:
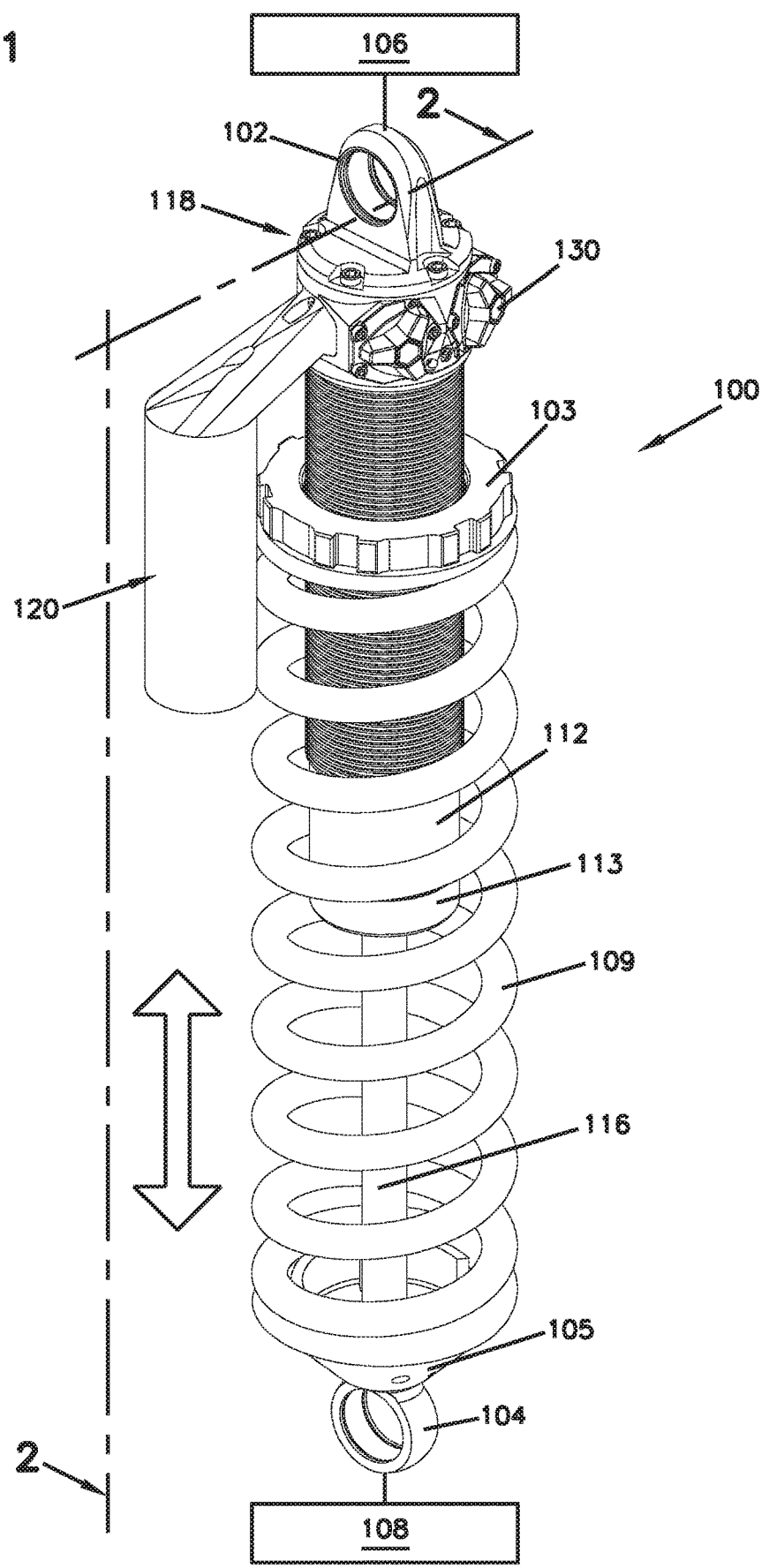
FIG. 1 illustrates a perspective view of an example shock absorber, according to one embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The bleed needle (i.e., low speed valve) disclosed herein has several advantages. The bleed needle includes a tip having an arrangement that allows for a linear relationship between the axial position of the needle vs. the orifice and the fluid flow area. Further, the tip of the bleed needle requires minimal inspection to produce consistent fluid flow results. In some examples, the bleed needle can be used in a shock absorber as a low speed valve.

A shock absorber described herein is merely one example wherein the bleed needle of the present disclosure can be utilized. It is considered within the scope of the present disclosure that the bleed needle can be utilized in any application that requires metered fluid flow between fluid passages. For example, the bleed needle may be implemented in, but not limited to, hydraulic cylinder flow control, air cylinder flow control, and fluid dispenser metering.

Figure 2:
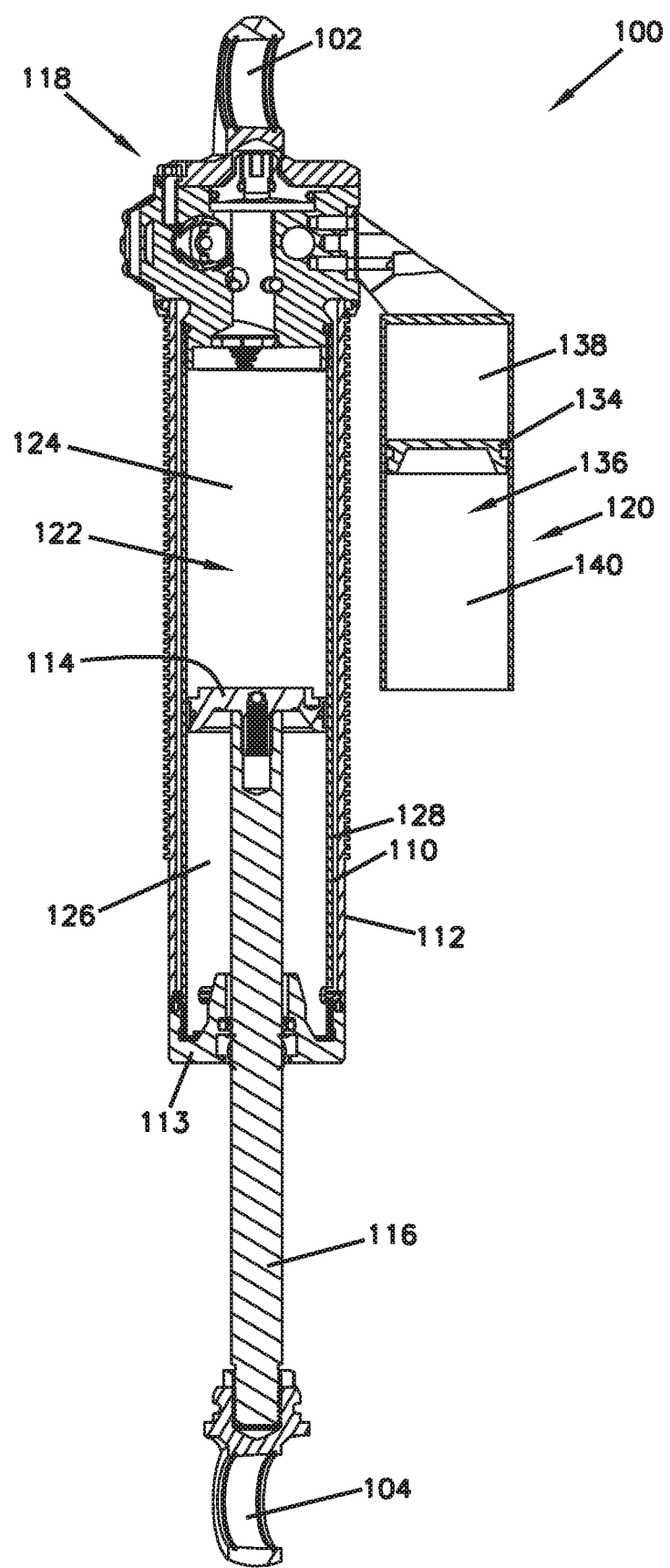
FIG. 2 illustrates a cross sectional view of the shock absorber along line 2-2 in FIG. 1.

A shock absorber 100 is shown in FIG. 1 and FIG. 2. In one example, the shock absorber 100 is a twin tube shock absorber. In other examples, the shock absorber 100 is a monotube shock absorber. In one example, the shock absorber 100 can be used as a strut. In other examples, the shock absorber 100 can be used as a shock absorber. In some examples, the shock absorber 100 is at least partially ornamental in nature and features nonfunctional elements.

In the depicted example, the shock absorber 100 has a first attachment point 102 and a second attachment point 104 positioned at either end of the shock absorber 100. As shown schematically, the first attachment point 102 can be attached to a first surface 106 and the second attachment point 104 can be attached to a second surface 108. During operation, the first surface 106 and the second surface 108 can move with respect to one other. In some examples, the first and second surfaces 106, 108 are surfaces on a vehicle such as a car, motorcycle, bicycle, etc. The shock absorber 100 is configured to damp kinetic energy transferred between the first and second attachment points 102, 104 using a damping medium that flows within the shock absorber 100. In some examples, the damping medium is a fluid, such as an oil.

A cross sectional view along line 2-2 in FIG. 1 of the shock absorber 100 is shown in FIG. 2. The shock absorber 100 includes an inner tube 110, an outer tube 112, a piston 114, a piston rod 116, a manifold 118, and a pressure reservoir 120. Optionally, the shock absorber 100 can also include a coil spring 109.

In some examples, the coil spring 109 can be retained around the shock absorber 100 between a ring 103 and a cup 105. In some examples, the ring 103 is attached to the outer tube 112 and the cup is positioned around the piston rod 116. In some examples, the ring is threadably adjustable around the outer tube 112 to alter the preload exerted on the spring by the ring 103 and cup 105.

The inner tube 110 includes an interior volume 122 that is divided into a first chamber 124 and a second chamber 126 by the piston 114. Each chamber 124, 126 can be filled with the damping medium. The volume of each chamber 124, 126 can be altered as the piston 114 moves within the inner tube 110.

The outer tube 112 is positioned around the inner tube 110. As shown, the inner and outer tubes 110, 112 define an annular fluid flow passage 128 between the tubes 110, 112. The annular fluid flow passage 128 facilitates fluid flow between the second chamber 126, the first chamber 124, and the manifold 118. In some examples, the outer tube 112 is captured between the manifold 118 and a cap 113. In some examples, the cap 113 is attached to the inner tube 110 and the inner tube 110 is attached to the manifold 118. In some examples, the inner tube 110 is captured between the manifold 118 and the cap 113. In some examples, the cap 113 is attached to the outer tube 112 and the outer tube 112 is attached to the manifold 118.

The piston 114 is connected to the piston rod 116 and is configured to move within the inner tube 110 as the second surface 108 moves. In some examples, the piston 114 is configured to allow fluid flow therethrough during operation, such operation will be discussed in more detail below with respect to FIGS. 27-30.

The manifold 118 is in contact with, and in fluid communication with, the inner and outer tubes 110, 112. In some examples, the manifold 118 is attached to the inner tube 110 and not attached to the outer tube 112. In some examples, the manifold 118 is attached to the outer tube 112 and not attached to the inner tube 110. The manifold 118 includes a plurality of fluid flow passages therein to facilitate fluid flow within the shock absorber 100. Such fluid flow passages will be explained in more detail with respect to FIGS. 4-6. In some examples, the manifold 118 houses at least one high-speed valve 130. As depicted, the manifold 118 includes a pair of high speed valves 130. In some examples, the manifold 118 can also house at least one low speed valve 132. As depicted, the manifold 118 includes a pair of low speed valves 132. The high speed valves 130 and the low speed valves 132 will be discussed in more detail herein. An example of the high speed valves 130a, 130b are disclosed in U.S. Non-Provisional application entitled "Shock Absorber with Dry Valving" with: Ser. No. 16/115,378 filed on even date herewith and herein incorporated by reference in its entirety.

The pressure reservoir 120 is attached to, and in fluid communication with, the manifold 118. The pressure reservoir 120 can include a floating piston 134 that divides an internal chamber 136 into a first pressure reservoir chamber 138 and a second pressure reservoir chamber 140. The second pressure reservoir chamber 140 can be pressurized via a secondary medium different from that of the damping medium. In some examples, the secondary medium can be a gas. The pressure reservoir 120 pressurizes the damping fluid within the shock absorber 100 so that there exists a positive damping fluid pressure in both the first and second chambers 124, 126 of the inner tube 110.

During operation of the shock absorber 100, the piston rod 116 moves the piston 114 within the inner tube 110 of the shock absorber 100. As the piston 114 moves within the inner tube 110, the piston 114 displaces damping fluid contained within either the first or second chambers 124, 126. If damping fluid is displaced from the first chamber 124 by the piston 114, such an event is referred to as a compression event for the shock absorber 100. If damping fluid is displaced from the second chamber 126 by the piston 114, such an event is referred to as a rebound event.

Generally, when damping fluid is displaced from either the first or second chambers 124, 126 of the inner tube 110, the damping fluid travels through the manifold 118 and back into the opposite chamber of the inner tube 110 from which it was displaced. In some examples, fluid flow can also travel through the high speed valve 130 and/or the low speed valve 132 before returning to the opposite chamber.

In some examples, fluid flow into and out of the first chamber 124 of the inner tube 110 can occur within the manifold 118. In some examples, fluid flow into and out of the second chamber 126 of the inner tube 110 can occur partially within the manifold 118 and partially within the annular fluid flow passage 128 between the inner and outer tubes 110, 112.

Figure 4:
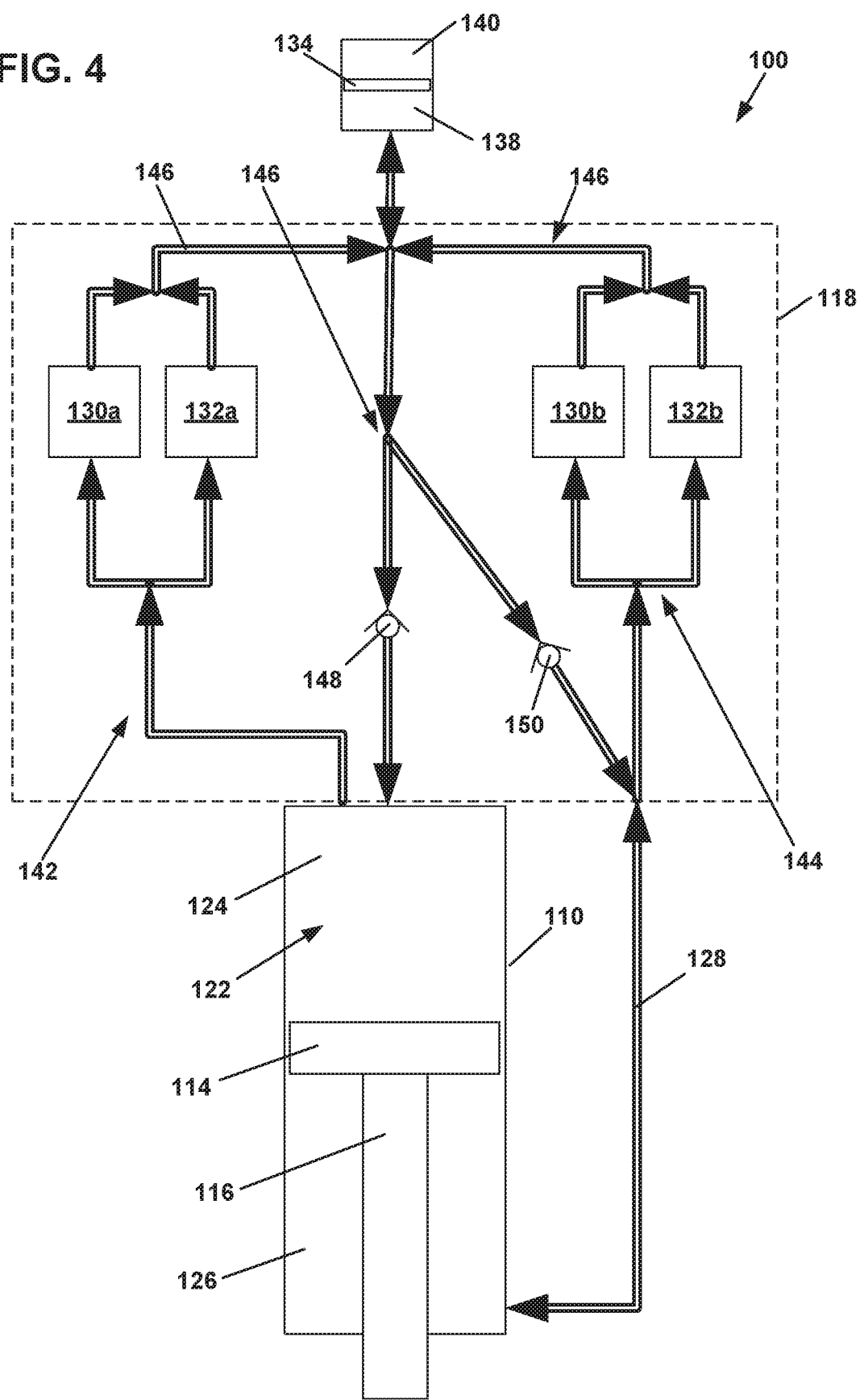
FIG. 4 illustrates a schematic representation of the shock absorber of FIG. 1.

FIG. 4 shows the schematic representation of the shock absorber 100. The shock absorber 100 includes a first chamber passage 142, a second chamber passage 144, a third shared passage 146, a first chamber check valve 148, and a second chamber check valve 150. As noted above, the manifold 118 includes a plurality of fluid passages including, but not limited to, the first chamber passage 142, the second chamber passage 144, and the third shared passage 146. The manifold 118 is also shown to include a pair of high-speed valves 130a, 130b and a pair of low speed valves, 132a, 132b. Further, as depicted, the pressure reservoir 120 and the annular fluid flow passage 128 are in fluid communication with the manifold 118.

The first chamber passage 142 connects the first chamber 124 of the inner tube 110 to the high-speed valve 130a and the low speed valve 132a. In some examples, the first chamber passage 142 is entirely contained within the manifold 118. In other examples, the first chamber passage 142 can be partially external of the manifold 118. In some examples, fluid flow leaves the first chamber 124 via the first chamber passage 142. Once fluid flow reaches the high speed valve 130a and low speed valve 132a, fluid flow can then pass through either and/or both of the high speed valve 130a and the low speed valve 132a.

Depending on the rate of fluid flow through the shock absorber 100 during operation, fluid flows through either the high-speed valve 130a or the low speed valve 132a. This fluid flow rate is determined by the speed at which the piston rod 116 moves the piston 114 within the inner tube 110. For example, when fluid flow is moving relatively quickly, sufficient fluid pressure is created so that fluid can pass through and interact with the high speed valve 130a. Similarly, when fluid flow is moving relatively slowly, generating lower pressure, fluid can pass through and interact with the low speed valve 132a. In some examples, the low speed valve 132a can be always open and therefore always allow a certain amount of flow (sometimes referred to as bleed) therethrough. The high speed valve 130a and the low speed valve 132a can be configured to alter the damping characteristics and operation of the shock absorber 100 by changing how the fluid flow travels within the manifold 118.

The second chamber passage 144 is in communication with the second chamber 126 of the inner tube 110. In some examples, the second chamber passage 144 is in indirect communication with the second chamber 126. In some examples, the second chamber passage 144 is connected to the annular fluid flow passage 128 to connect to the second chamber 126 of the inner tube 110. In some examples, the second chamber passage 144 is entirely contained within the manifold 118. In other examples, the second chamber passage 144 can be partially external of the manifold 118.

In the depicted example, fluid flow leaves the second chamber 126 via the annular fluid flow passage 128 which connects with the second chamber passage 144 within the manifold 118. Fluid flow can then pass through either and/or both the high speed valve 130b and the low speed valve 132b.

In some examples, the high-speed valve 130b and the low speed valve 132b are substantially similar to the high speed valve 130a and the low speed valve 132a in both construction and operation. In some examples, the high speed valve 130b and the low speed valve 132b can have different operating characteristics from the high speed valve 130a and the low speed valve 132a. The high speed valve 130b and the low speed valve 132b can be configured to alter the damping characteristics and operation of the shock absorber 100 by changing how the fluid flow interacts with the high speed valve 130b and the low speed valve 132b.

The third shared passage 146 is in fluid communication with the first chamber passage 142 and the second chamber passage 144. The third shared passage 146 is configured to deliver fluid to either the first or second chambers 124, 126 of the inner tube 110. The third shared passage 146 receives fluid from the first chamber passage 142 via the high speed valve 130a and low speed valve 132a. The third shared passage 146 receives fluid from the second chamber passage 144 via the high speed valve 130b and low speed valve 132b. Due to the configuration of the shock absorber 100, the third shared passage 146 will only receive fluid flow from one of the first chamber passage 142 or the second chamber passage 144 at a time.

In some examples, the pressure reservoir 120 can be in fluid communication with the third shared passage 146. Because the third shared passage 146 contains a lower fluid pressure than the first chamber passage 142 and the second chamber passage 144, the pressure reservoir 120 is therefore in communication at all times with the low pressure portion of the shock absorber 100. This allows the overall shock absorber to operate with lower pressures, thereby increasing the stability and reliability of the shock absorber 100. In some examples, the pressure reservoir 120 reduces cavitation within the inner tube 110 when the piston 114 is moving therein.

The first chamber check valve 148 is a valve that is configured to prevent fluid flow from the first chamber 124 into the third shared passage 146 and only allow fluid from the third shared passage 146 into the first chamber 124. In some examples, the first chamber check valve 148 can be a spring-loaded valve. In such an example, the spring of the check valve 148 can be tuned so that the check valve operates and opens only at certain pressures.

The second chamber check valve 150 is a valve that is configured to prevent fluid flow from the second chamber 126 into the third shared passage 146 and only allow fluid from the third shared passage 146 into the second chamber 126. In some examples, the second chamber check valve 150 can be substantially similar to the first chamber check valve 148.

Figure 5:
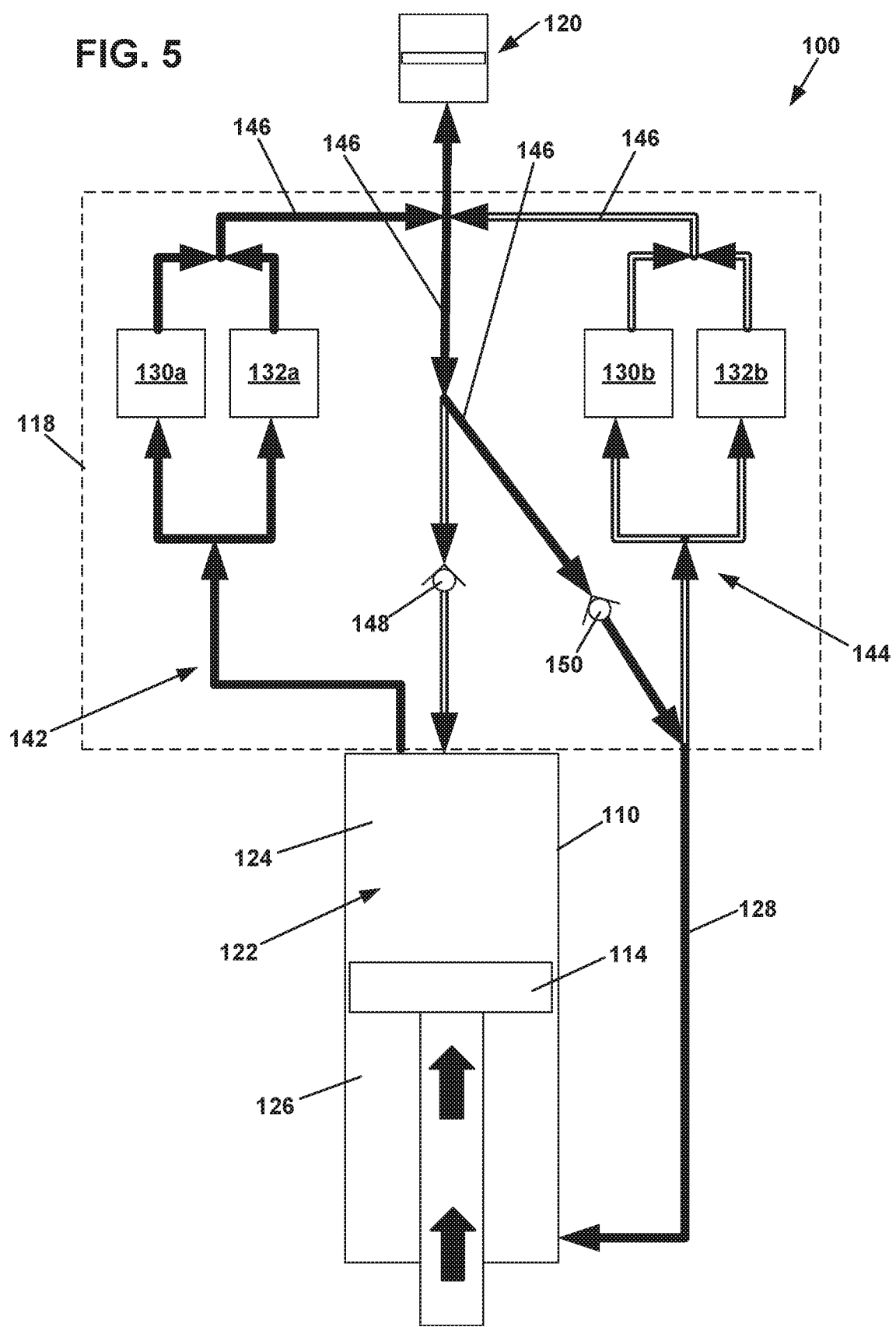
FIG. 5 illustrates a schematic representation of the shock absorber of FIG. 1 during a compression event.

FIG. 5 shows the shock absorber 100 during a compression event. During a compression event, piston 114 forces fluid from the first chamber 124 of the inner tube 110 to the first chamber passage 142. Fluid then flows through the high-speed valve 130a if it's a high speed compression event and/or through the low speed valve 132a if it's a low speed compression event. An example of a high speed compression event would be a vehicle hitting a pothole or braking hard. An example of a low speed compression event would be a vehicle transferring its weight during cornering or traversing a gradual undulation in the road. In some examples, the high speed valve 130a will only allow fluid flow therethrough when certain pressures exist in the first chamber passage 142. The low speed valve 132a is configured to allow fluid flow therethrough at pressures that are lower than those required to open the high speed valve 130a.

Once fluid passes through the high speed valve 130a and/or the low speed valve 132a, fluid flow enters the third shared passage 146. Once within the third shared passage 146, the fluid flows through the shared passage 146, through the second check valve 150, into the annular fluid flow passage 128, and finally into the second chamber 126. Return fluid flow into the second chamber 126 is at a lower fluid pressure relative to fluid leaving the first chamber 124.

When fluid is within the third shared passage 146, fluid cannot flow through the first chamber check valve 148 due to pressure on the opposite side of the first chamber check valve 148, within the first chamber 124. Such pressure is created within the first chamber 124 by the compression movement of the piston 114.

Fluid flow is allowed through the second chamber check valve 150 due to a lack of pressure on the opposite side of the valve 150. This is due to the fact that fluid flow is entering the second chamber 126 and not leaving the chamber 126. If fluid flow was leaving the chamber 126, such flow would exert pressure on the opposite side of the second chamber check valve 150, thereby preventing flow between the third shared passage 146 and the second chamber 126.

Figure 6:
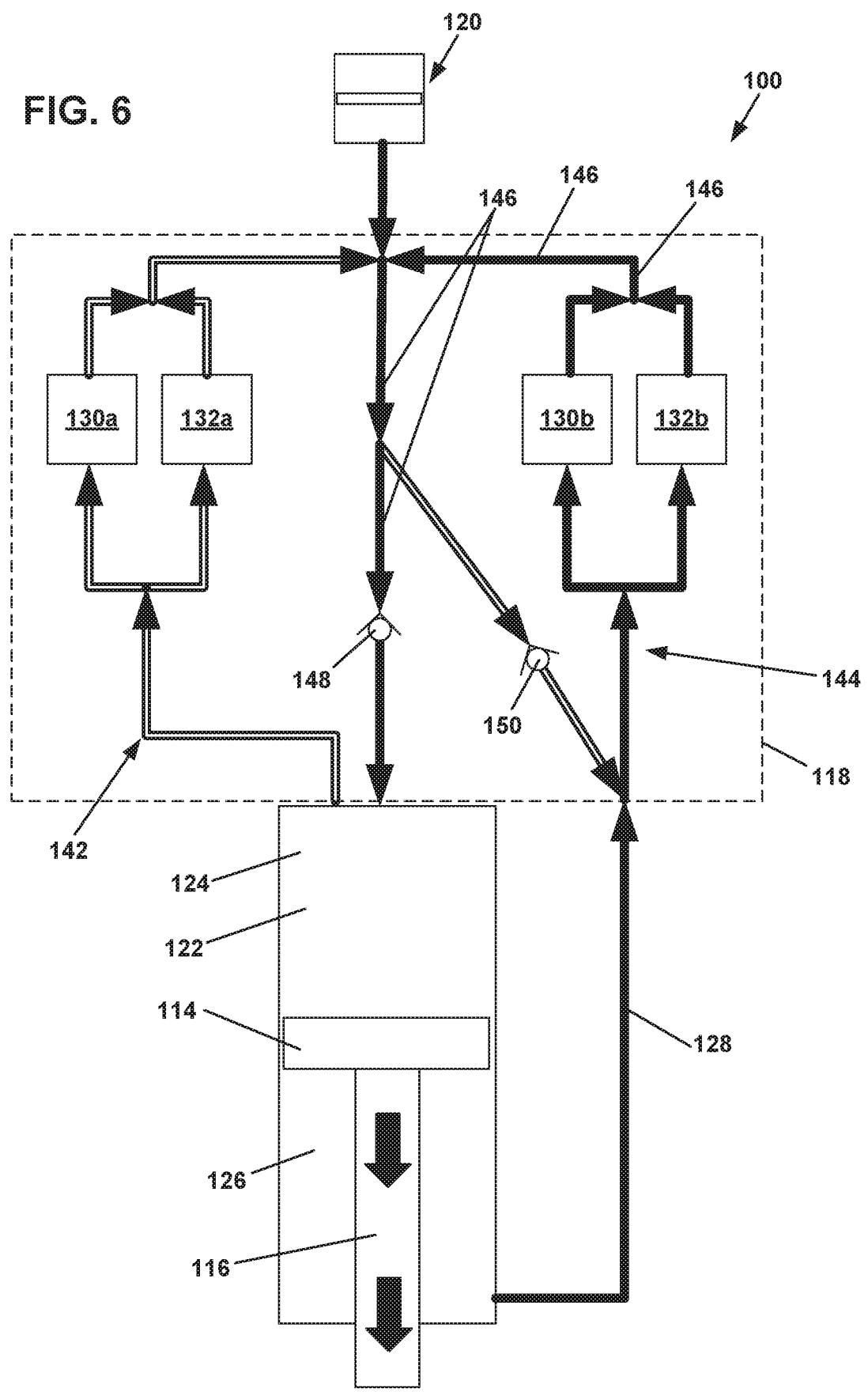
FIG. 6 illustrates a schematic representation of the shock absorber of FIG. 1 during a rebound event.

FIG. 6 shows the shock absorber during a rebound event. The rebound event is opposite of a compression event. During a rebound event, the piston 114 forces fluid from the second chamber 126. As fluid exits the second chamber 126, it enters the annular passage 128. From the annular passage 128, fluid flows into the second chamber passage 144 until it reaches the high speed valve 130b and the low speed valve 132b. Just like during the compression event, fluid flows through the high speed valve 130b and/or the low speed valve 132b to reach the third shared passage 146. Once within the third shared passage 146, fluid flows from the third shared passage 146, through the first chamber check valve 148, and into the first chamber 124. Fluid is allowed through the first chamber check valve 148 because fluid is entering the first chamber 124, and not leaving, therefore little pressure exists on the first chamber side of the first chamber check valve 148. Return fluid flow into the first chamber 124 is at a lower fluid pressure relative to fluid leaving the second chamber 126.

Figure 3:
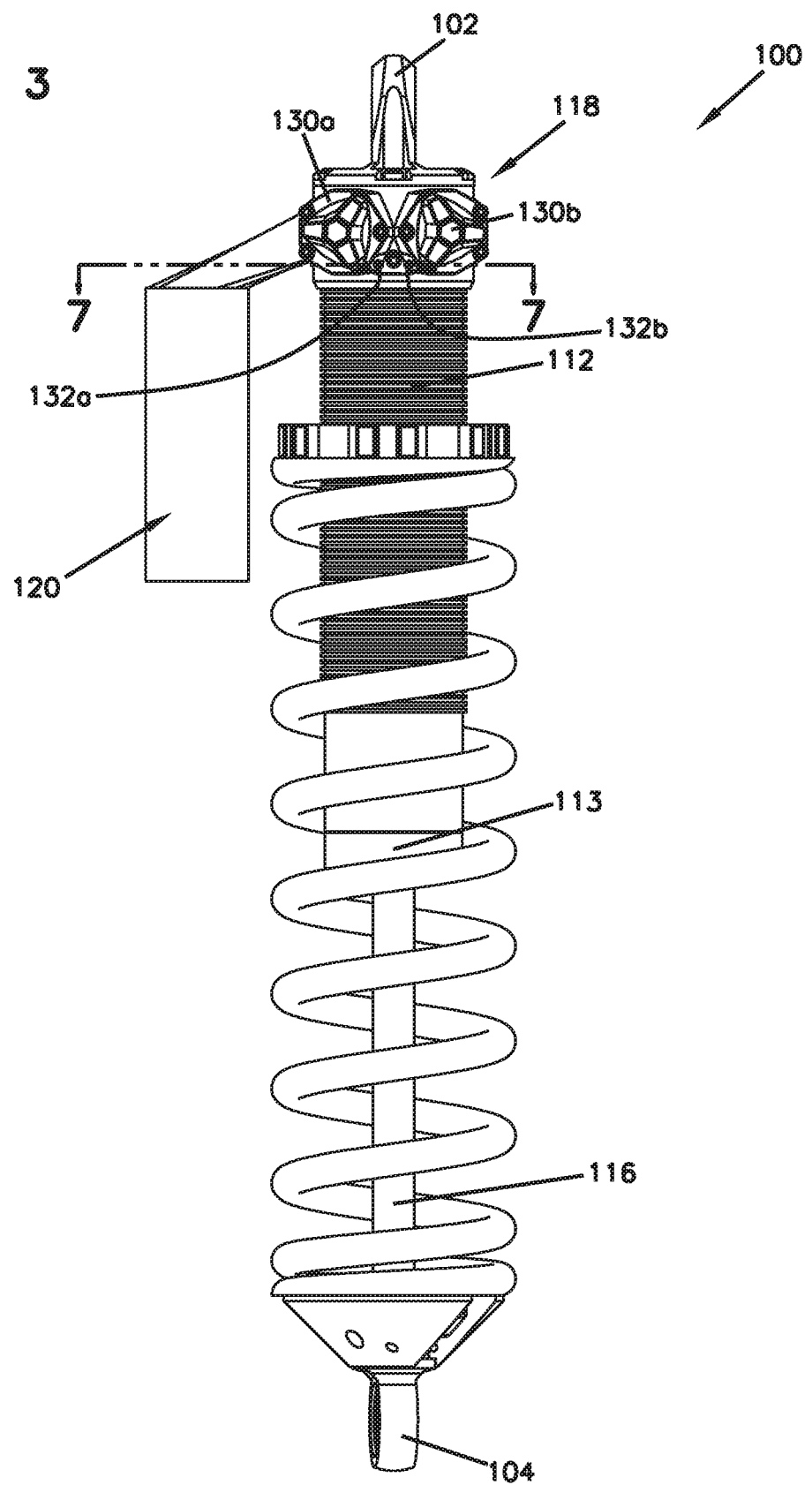
FIG. 3 illustrates a front view of the shock absorber of FIG. 1.
Figure 7:
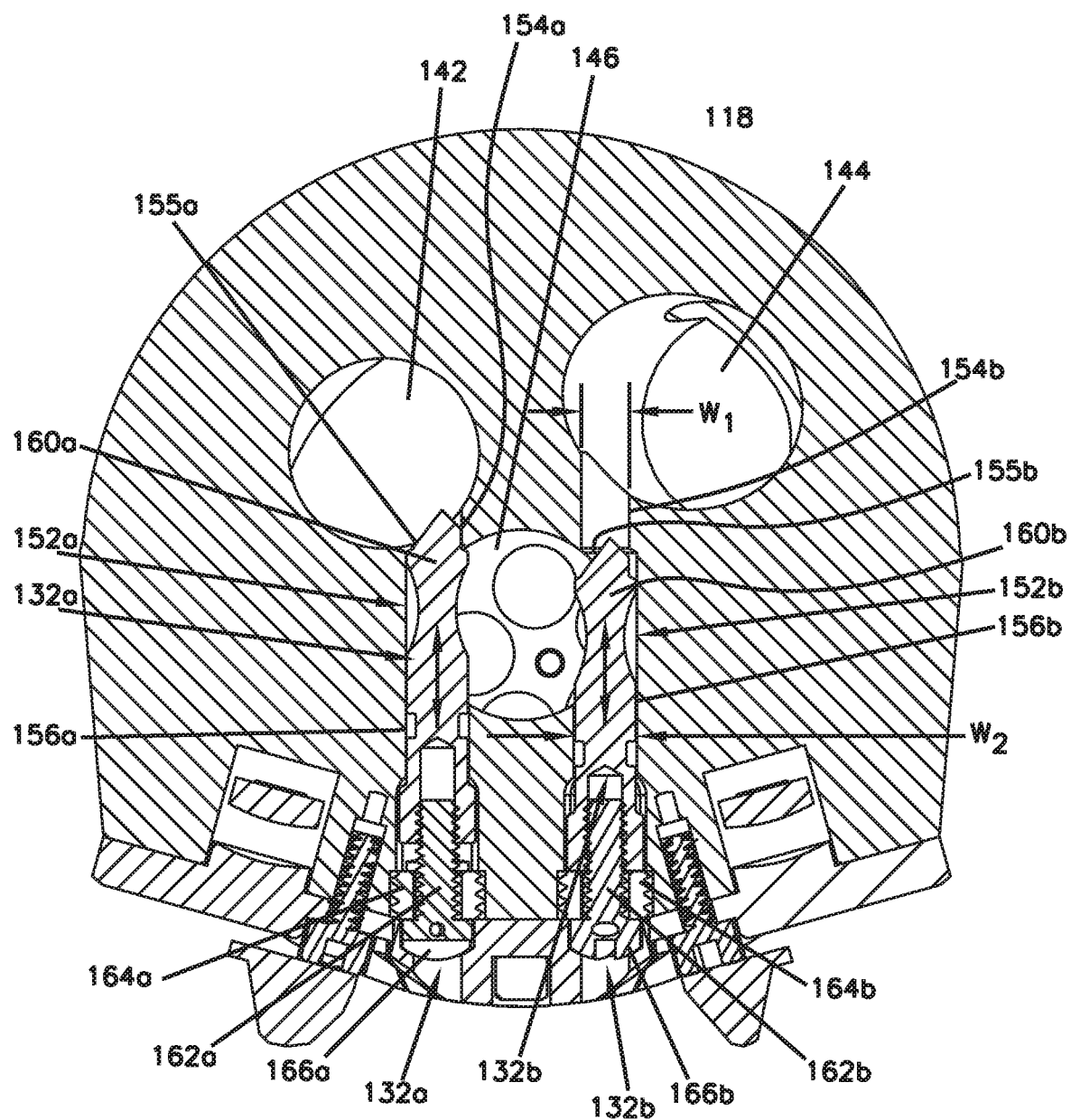
FIG. 7 illustrates a cross sectional view of the shock absorber along line 7-7 in FIG. 3.

FIG. 7 shows a cross sectional view of the shock absorber 100 along line 7-7 in FIG. 3. Similar to the high speed valve 130a described above, the low speed valve 132a is shown to selectively allow fluid between the first chamber passage 142 and the third shared passage 146. Further, the valve 132b is shown to selectively allow fluid flow between the second chamber passage 144 and third shared passage 146.

Each low speed valve 132a, 132b is movably positioned within (as indicated by arrows in FIG. 7) a low speed fluid chamber 152a, 152b within the manifold 118. In some examples, each valve 132a, 132b can selectively block flow through each low speed fluid chamber 152a, 152b. In some examples, the valves 132a, 132b can be adjustable to allow a metered amount of fluid flow between the first chamber passage 142/second chamber passage 144 and the third shared passage 146. In other examples, the valves 132a, 132b are fixed to allow a non-adjustable flow within the low speed fluid chamber 152a, 152b.

Each low speed fluid chamber 152a, 152b connects the first and second chamber passages 142, 144 to the third shared passage 146, respectively. In some examples, the low speed fluid chamber 152a, 152b includes a first portion 154a, 154b that has a width W1 that is less than a width W2 of a second portion 156a, 156b. In some examples, the first portion 154a, 154b has an opening 155a, 155b adjacent the second portion 156a, 156b and the third shared passage 146.

Further, each valve 132a, 132b includes a valve body 160a, 160b and an adjustment mechanism 162a, 162b.

The valve body 160a, 160b of each valve 132a, 132b can be a unitary piece or constructed of a plurality of individual components. In some examples, the valve body 160a, 160b is entirely positioned within the low speed fluid chamber 152a, 152b. In other examples, the valve body 160a, 160b in positioned at least partially within the low speed fluid chamber 152a, 152b.

In some examples, the adjustment mechanism 162a, 162b of each valve 132a, 132b is configured to allow the user to adjust the positioning of the valve 132a, 132b, specifically the valve body 160a, 160b, within the low speed fluid chamber 152a, 152b. In some examples, the adjustment mechanism 162a, 162b can be attached to the manifold 118 at a first attachment portion 164a, 164b and in movable contact with the valve body 160a, 160b. In some examples, as the adjustment mechanism 162a, 162b of each valve 132a, 132b is rotated about a longitudinal axis, the adjustment mechanism 162a, 162b causes the valve body 160a, 160b to move longitudinally within the low speed fluid chamber 152a, 152b. In some examples, the user can rotate the adjustment mechanism 162a, 162b via an adjustment interface 166a, 166b. In some examples, the adjustment interface 166a, 166b is a head of a bolt or screw. In other examples, the adjustment interface 166a, 166b is a knob.

Therefore, depending on the low speed damping response sought, the user can adjust the position of the valves 132a, 132b within each low speed fluid chamber 152a, 152b to achieve the desired damping response. In some examples, the adjustment mechanism 162a, 162b can include predetermined detent positions that correspond to consistent changes in low speed damping behavior of the shock absorber 100.

Figure 8:
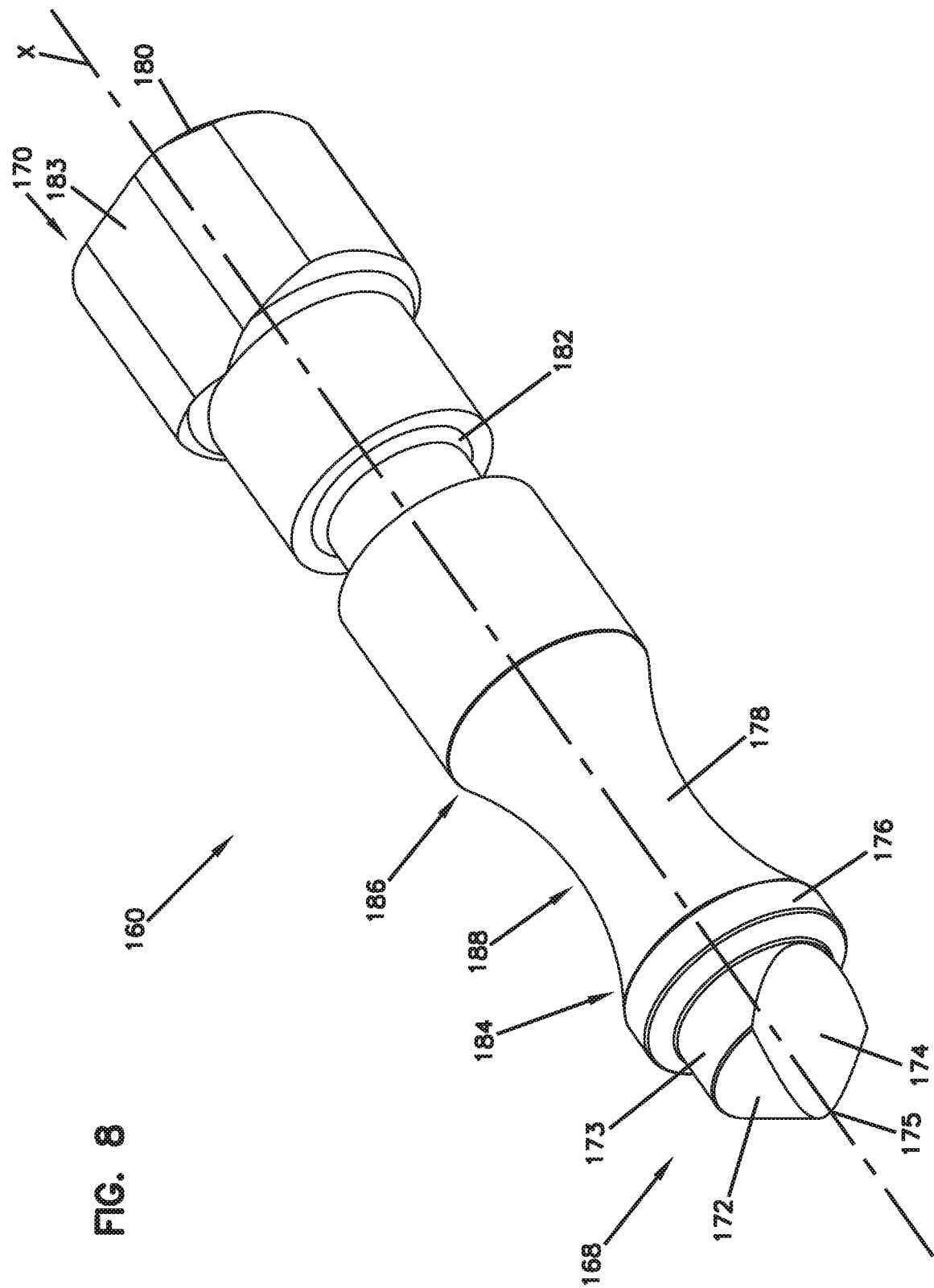
FIG. 8 illustrates a perspective view of a low speed valve body, according to one embodiment of the present disclosure.

FIG. 8 shows a perspective view of the valve body 160. As noted above, the valves 132a, 132b can be substantially similar and therefore only a single valve body 160 will be described herein. In some examples, the valve body 160 is at least partially ornamental in nature and features nonfunctional elements.

Figure 9:
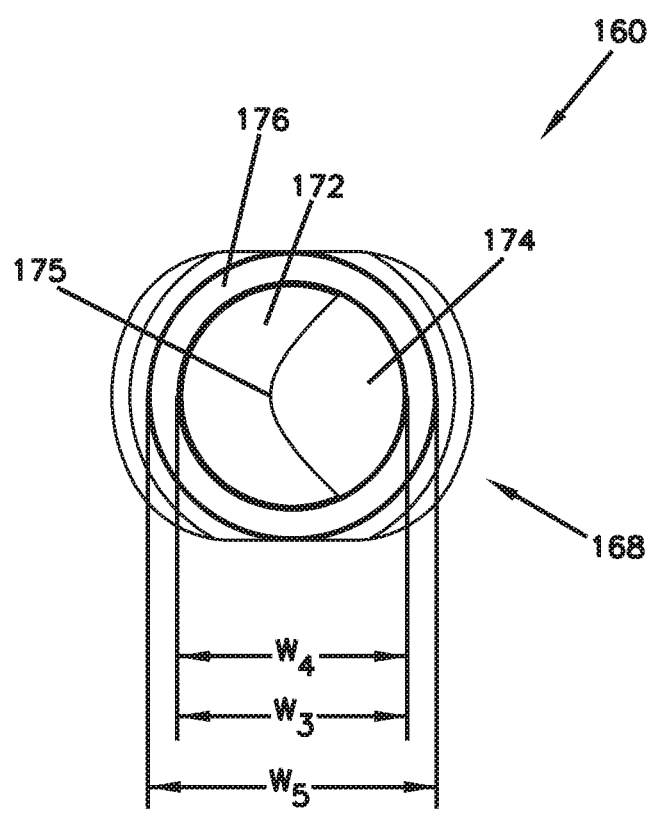
FIG. 9 illustrates a front view of the low speed valve body of FIG. 8.
Figure 10:
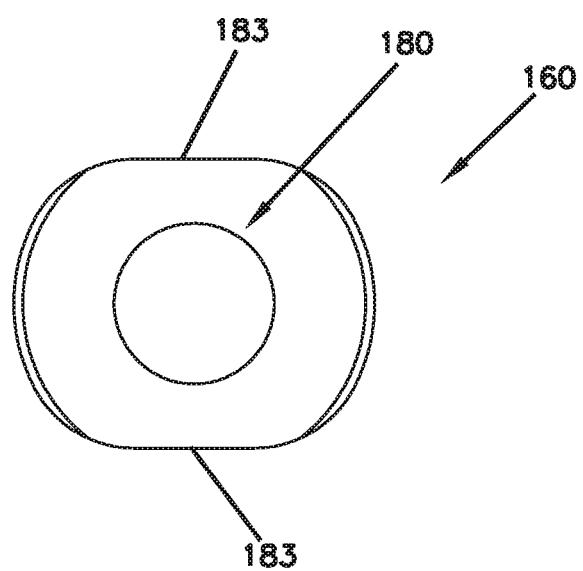
FIG. 10 illustrates a rear view of the low speed valve body of FIG. 8.

FIG. 9 shows a front view of the valve body 160 at a first end 168, and FIG. 10 shows a rear view of the valve body 160 at a second end 170.

FIG. 11 shows a top view of the valve body 160, and FIG. 12 shows a side view of the valve body 160.

FIG. 13 shows a side view of the valve body 160, and FIG. 14 shows another side view of the valve body 160.

Figure 15:
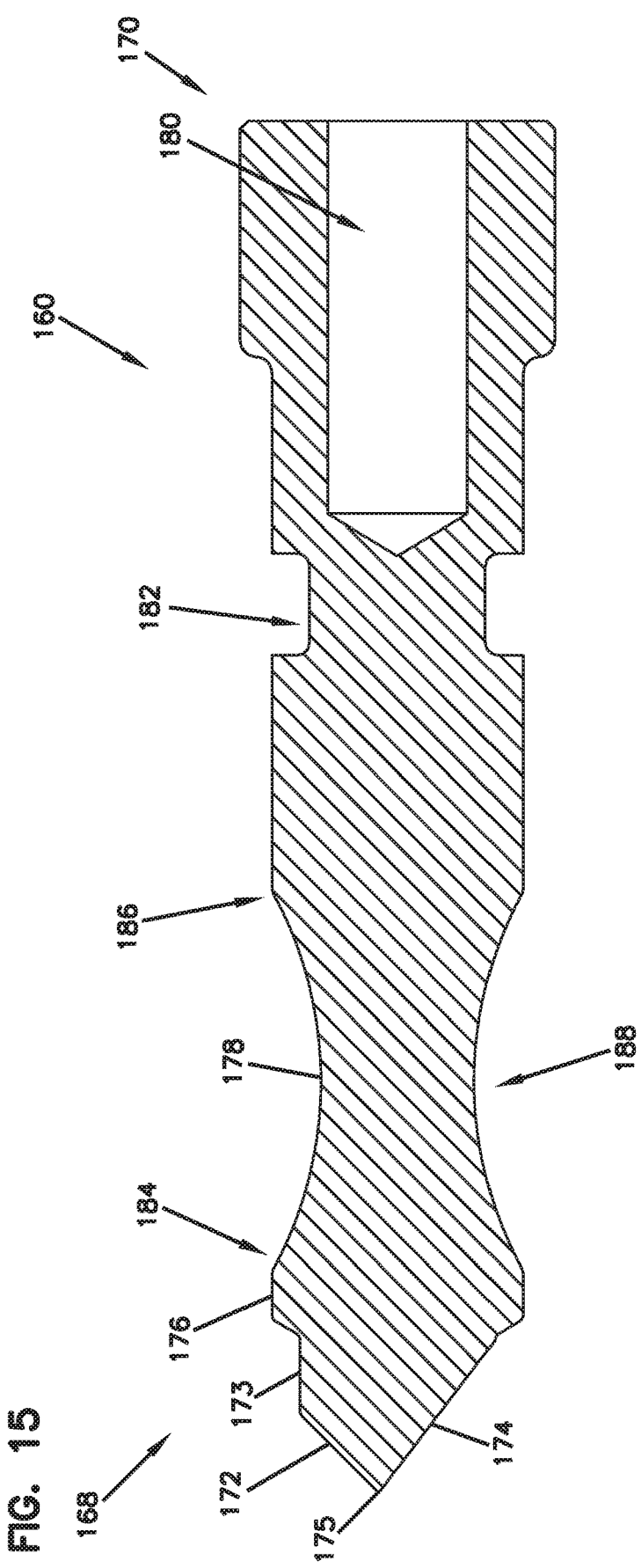
FIG. 15 illustrates a cross sectional view of the low speed valve body along line 15-15 in FIG. 13.

FIG. 15 shows a longitudinal cross section of the valve body along line 15-15 in FIG. 14.

The valve body 160 includes a longitudinal axis X, the first end 168, and the second end 170. In some examples, the first end 168 is a proximate end and the second end 170 is a distal end. At the first end 168, the valve body 160 includes a conical portion 172, a cylindrical portion 173, a face 174, a valve body tip 175, and a shoulder 176. In some examples, the valve body 160 includes a tapered section 178 positioned between the first and second ends 168, 170. At the second end 170, the valve body 160 includes an adjustment mechanism interfacing portion 180, a seal recess 182, and, optionally, a plurality of flats 183.

In operation, when the valve body 160 is positioned to allow fluid flow between the first chamber passage 142/ second chamber passage 144 and the third passage 146, fluid contacts the conical portion 172, cylindrical portion 173, and face 174. In some examples, fluid flows from the tip 175, past the conical portion 172 and face 174, past the cylindrical portion 173, and into the third shared chamber 146

In the depicted example, the conical portion 172 is immediately axially adjacent the cylindrical portion 173. In some examples, the conical portion 172 is at least partially conical. In some examples, the conical portion 172 at least partially surrounds the body 160 and is circumferentially adjacent to at least a portion of the face 174. In the depicted example, the conical portion 172 at least partially defines the valve body tip 175. The conical portion 172 tapers as it extends from the cylindrical portion 173 to the valve body tip 175. In some examples, the conical portion 172 can have a maximum width W3 (e.g., diameter). In some examples, the width W3 of the conical portion 172 is less than the width W1 of the first portion 154a, 154b of the low speed fluid chamber 152a, 152b.

The cylindrical portion 173 of the first end 168 is positioned axially between the conical portion 172 and the shoulder 176. In some examples, the cylindrical portion 173 partially surrounds the valve body 160. In other examples, the cylindrical portion 173 is circumferentially adjacent at least a portion of the face 174. In some examples, the cylindrical portion 173 can have a maximum width W4 (e.g., diameter) that is greater than or equal to the maximum width W3 of the conical portion 172. In some examples, the width W4 of the cylindrical portion 173 is less than the width W1 of the first portion 154a, 154b of the low speed fluid chamber 152a, 152b.

The face 174 is axially adjacent to the shoulder 176 and circumferentially adjacent on the valve body 160 to the conical portion 172 and the cylindrical portion 173. In some examples, the face 174 is planar. In some examples, the face 174 is angled with respect to the longitudinal axis X of the valve body 160, which will be described in more detail herein with respect to FIG. 16. The face 174 at least partially defines the valve body tip 175.

The valve body tip 175 is defined by both the conical portion 172 and the face 174. As shown in FIGS. 11-14, the valve body tip 175 is radially offset from the longitudinal axis X. The valve body tip 175 can be defined by the intersection of the face 174 and the conical portion 172 at the furthest proximate point of the valve body 160.

The shoulder 176 is axially adjacent the tapered section 178 and the cylindrical portion 173. In some examples, the shoulder 176 can have a maximum width W5 (e.g., diameter) that is greater than or equal to the maximum width W4 of the cylindrical portion 173. In some examples, the shoulder 176 includes a tapered face 177 that extends from the cylindrical portion 173 to the maximum width W5 of the shoulder 176. In some examples, the width W5 of the shoulder 176 is greater than or equal to the width W1 of the first portion of the low speed fluid chamber 152a, 152b The tapered section 178 is generally axially adjacent the first and second ends 168, 170 of the valve body 160. Specifically, the tapered section 178 includes a first end portion 184 axially adjacent the first end 168 and a second end portion 186 axially adjacent the second end 170. The tapered section 178 further includes a middle portion 188. As shown, the outer diameter of the tapered section 178 decreases from the first end portion 184 axially toward the middle portion 188 and also decreases from second end portion 186 axially toward the middle portion 188.

In some examples, the tapered section 178 can at least be at least partially positionable within the third shared passage 146 of the manifold 118. The tapered section 178 can be shaped to minimized fluid flow obstruction within the third shared passage 146.

The adjustment mechanism interfacing portion 180 is positioned at the second end 170 and is configured to interface with the adjustment mechanism 162a, 162b of each valve 132a, 132b. In some examples, the adjustment mechanism interfacing portion 180 is configured to be coupled to the adjustment mechanism 162a, 162b. In some examples, the adjustment mechanism interfacing portion 180 is threadably attached to the adjustment mechanism 162a, 162b. In some examples, the adjustment mechanism interfacing portion 180 is an aperture, as shown in FIGS. 10 and 15, that is configured to receive the adjustment mechanism 162a, 162b. In some examples, the adjustment mechanism interfacing portion 180 is a threaded aperture.

The seal recess 182 is configured to receive a seal, such as an O-ring, to seal the first end 168 and tapered section 178 from the second end 170 when installed in the low speed fluid chamber 152a, 152b.

The optional flats 183 are configured to interface with the low speed fluid chamber 152a, 152b to prevent the valve 132a, 132b from rotating within the chamber 152a, 152b. Similarly, in the example shown in FIG. 10, the valve body 160 can have a non-circular cross section at the second end 170 to prevent rotation of the valve body 160 with respect to the chamber 152a, 152b.

Figure 16:
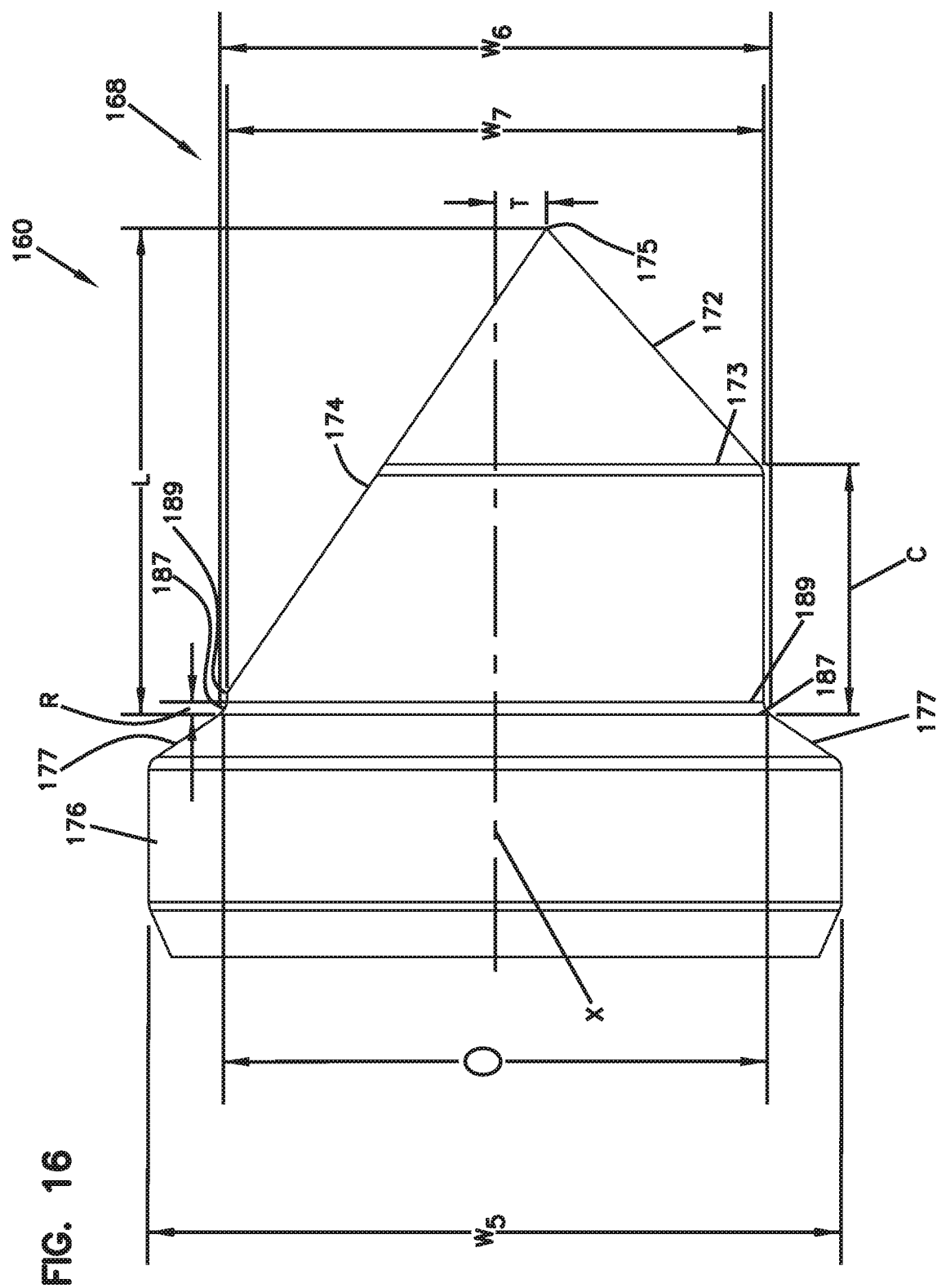
FIG. 16 illustrates a zoomed-in view of a first end of the low speed valve body of FIG. 8.

The first end 168 of the valve body 160 is shown in FIG. 16. In some examples, the configuration of the first end 168 can be determined by the diameter of an orifice O and an amount of valve movement allowed L. In one example, the diameter of the orifice O corresponds to the width W1 of the first portion 154a, 154b of the low speed fluid chamber 152a, 152b. In the depicted embodiments, the widths W3, W4 of the cylindrical portion 173 and the conical portion 172 are less than the width W1 of the first portion 154a, 154b. Further, the width W5 of the shoulder 176 is greater than the width W1 of the first portion 154a, 154b of the low speed fluid chamber 152a, 152b. Because of this, the conical portion 172 and the cylindrical portion 173 can move within the first portion 154a, 154b of the low speed fluid chamber 152a, 152b. However, because the width W5 of the shoulder 176 is greater than the width W1 of the first portion 154a, 154b, the shoulder width W5 limits movement of the valve body 160 because the shoulder 176 is prevented from entering the first portion 154a, 154b.

Therefore, in the depicted example, the valve movement allowed L is equal to the combined axial width of the conical portion 172 and the cylindrical portion 173.

In some examples, the axial width C of the cylindrical portion 173 is given by $$C = 0.5 \times L$$

In some examples, the first end 168 can also have a radiused portion 187 and a ring portion 189 positioned immediately adjacent one another and between the tapered face 177 and the cylindrical portion 173. In some examples, the radiused portion 187 can have a radiused outer surface extending from the tapered face 177 to the cylindrical portion 173. In some examples, a maximum diameter W6 of the radiused portion 187 is greater that the width of the orifice O. In some examples, the width W6 is greater than or equal to the width W1 of the first portion 154a, 154b of the low speed valve chamber 152a, 152b.

In some examples, the radiused portion 187 is configured to interface with the first portion of 154a, 154b, specifically the opening 155a, 155b, of the low speed fluid chamber 152a, 152b to form a seal.

The ring portion 189 can be a cylindrical portion that surrounds the entire valve body 160. In some examples, the ring portion 189 can have a width W7 that is less than the width of the width W1 of the first portion 154a, 154b of the low speed fluid chamber 152a, 152b. In some examples, the ring portion 189 has an axial width R given by $$R=0.03 \times L$$

In the depicted example, the valve body tip 175 is offset from the longitudinal axis X a distance T. In some examples, the distance T can be above the longitudinal axis X (i.e., positively offset) or below the longitudinal axis X (i.e., negatively offset). In some examples, T is given by $$T=0.01 \times O$$

As shown, the face 174 is planar and starts at the valve body tip 175 and angles toward a point between the cylindrical portion 173 and the shoulder 176. In some examples, the face 174 angles to the ring portion 189. Such angling of the face results in the face 174 being angled with respect to the longitudinal axis X of the valve body 160.

FIG. 16 merely shows one example of how the first end 168 can be configured. However, there are a variety of ways to achieve the same operating characteristics. In general, the present disclosure is drawn to a valve body 160 having a face 174 at a first end 168 that is angled with a longitudinal axis X of the valve body 160. In some examples, such a configuration reduces the need to carefully inspect the first end 168, specifically the conical portion 172, of the valve body 160 while achieving similar consistent, repeatable flow characteristics as the valve body 160 is moved within the low speed fluid chamber 152a, 152b. Specifically, in one example, as the valve body 160 is moved within the low speed fluid chamber 152a, 152b, the first end 168 is configured in a way that allows for consistent incremental changes in the damping behavior of the shock absorber 100.

Figure 17:
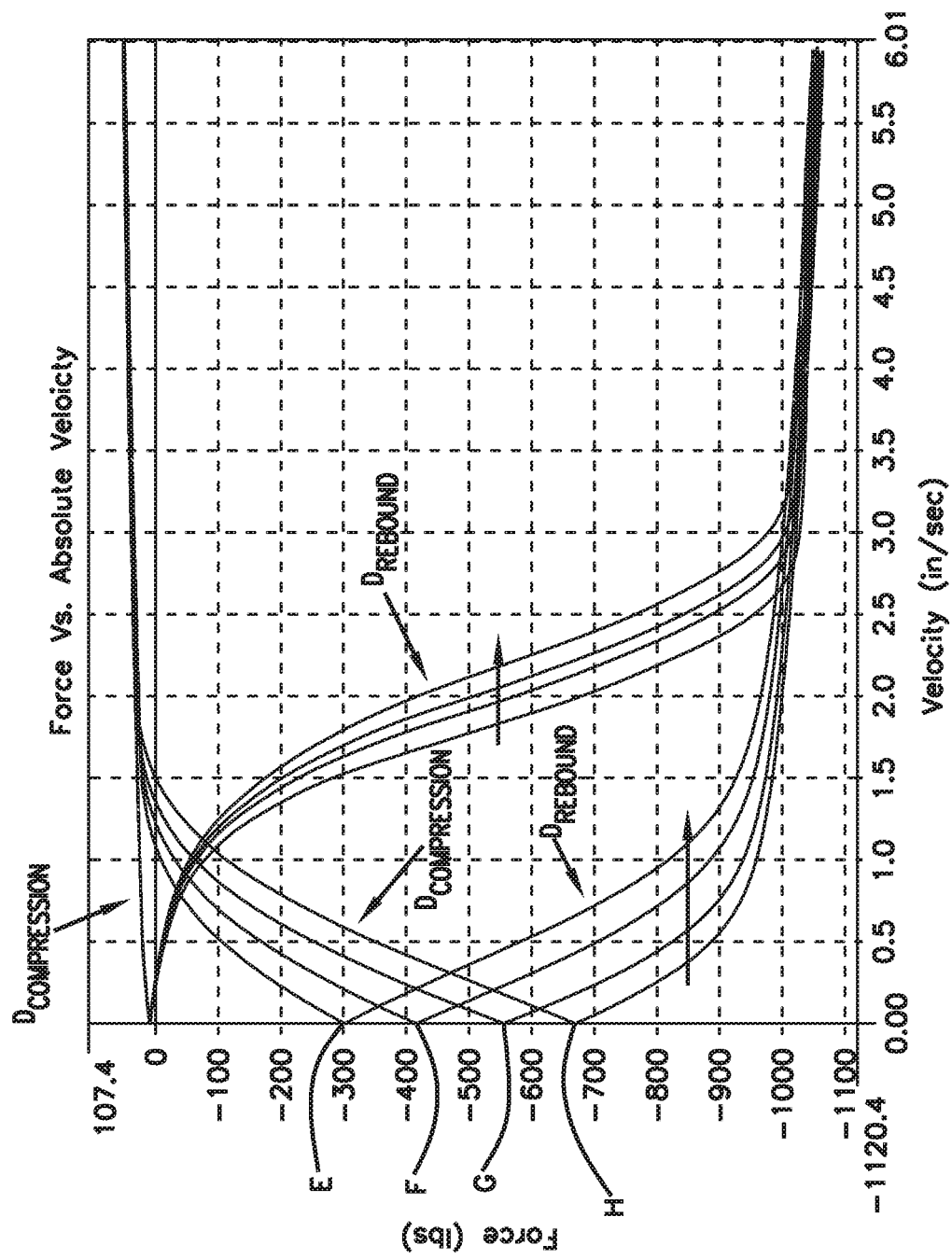
FIG. 17 illustrates an example performance graph of an example shock absorber including the low speed valve body of FIG. 8, according to one embodiment of the present disclosure.

FIG. 17 shows an example graph of the performance of the valves 132a, 132b. FIG. 17 merely shows one example and one application using the valves 132s, 132b and is meant to be illustrative in nature. Force is shown on the x-axis and velocity is shown on the y-axis. Specifically, the damping behavior of the shock absorber 100 is represented by two groups of damping curves labeled $D_{compression}$ and $D_{rebound}$. The $D_{compression}$ group of damping curves corresponds to the behavior of valve 132a when the shock absorber encounters a low speed compression event, and the $D_{rebound}$ group of curves corresponds to the behavior of valve 132b when the shock absorber encounters a low speed rebound event. The $D_{compression}$ group is shown to possess, at least initially, a positive slope, while the $D_{rebound}$ group is shown to possess, at least initially, a negative slope.

In the depicted example, each damping curve within each $D_{compression}$ and $D_{rebound}$ group represents a different position of the valve body 160a, 160b of each valve 132a, 132b within the low speed fluid chambers 152a 152b of the manifold 118. In some examples, the position of the valve body 160a, 160b can be adjusted by the adjustment mechanism 162a, 162b. In the depicted embodiment, each valve body 160a, 160b is adjustable between a plurality of positions E, F, G, H, with each position changing the location of the damping curve $D_{compression}$ and $D_{rebound}$ along the y-axis when the velocity is equal to zero (i.e., zero point). In some examples, each position E, F, G, H corresponds with detent positions of the adjustment mechanism 162a, 162b. When changing between each position E, F, G, H, each curve not only starts a different zero point, but each curve also shifts in positive x-direction (indicated in FIG. 17 by horizontal arrows), such spacing being relatively consistent between each curve. For example, when looking at positions E, F, G, H, each corresponding to a curve, at a given force value (y-value), the velocity (x-value) spacing between each curve is relatively consistent. This produces linear shock absorber response results when moving each valve 132a, 132b between each position E, F, G, H. Such linear results provide consistency and predictability of operation for the user.

As shown, as the position of the valves bodies 160a, 160b change (positions E, F, G, H,) the damping curves in the $D_{compression}$ group and $D_{rebound}$ group reach a slope near zero (i.e., steady state) at similar velocity values. Further, the damping curves $D_{compression}$ and $D_{rebound}$ are stepped along the y-axis at a consistent value, thereby producing consistent damping results as the position E, F, G, H of each valve 160a, 160b is altered.

Figure 18:
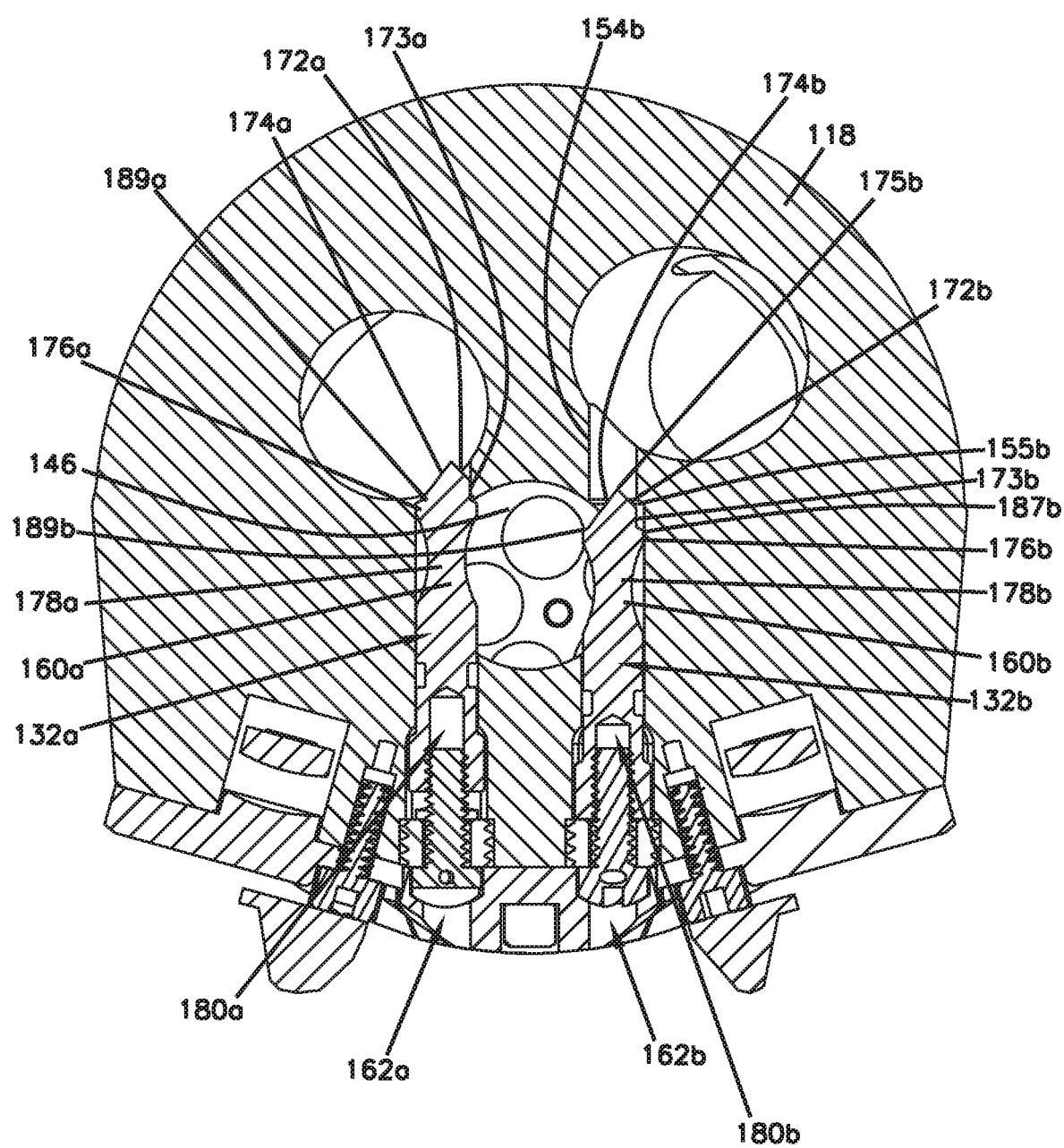
FIG. 18 illustrates a cross sectional view of the shock absorber along line 7-7 in FIG. 3.

FIG. 18 shows the same cross sectional view of the shock absorber shown in FIG. 7 alone line 7-7 in FIG. 2. To adjust the position of the valve body 160a, 160b within each low speed fluid chamber 152a 152b, the adjustment mechanism 162a, 162b is rotated. As rotation of the adjustment mechanism 162a, 162b occurs, in the depicted example, the adjustment mechanism interfacing portion 180a, 180b of each valve body 160a, 160b is either threaded or unthreaded onto the adjustment mechanism 162a, 162b. Such threading or unthreading causes the valve bodies 160a, 160b to move longitudinally within the low speed fluid chamber 152a, 152b.

As the valve body 160a, 160b moves within the low speed fluid chamber 152a, 152b, the amount of fluid the valve 132a, 132b allows to flow from the first chamber passage 142/second chamber passage 144 to the third shared passage 146 can be adjusted. For example, as fluid flows from the second chamber passage 144 to the third shared passage 144, fluid must pass the valve body tip 175, conical portion 172, cylindrical portion 173, face 174, and ring portion 189 within the first portion 154b of the valve chamber 152b. Depending on the position of the valve body tip 175, conical portion 172, cylindrical portion 173, face 174, and ring portion 189 within the first portion 154b, the valve body tip 175, conical portion 172, cylindrical portion 173, face 174, and ring portion 189 can act to restrict flow within the low speed fluid chamber 152b. For example, the closer the shoulder 176 of the valve body 160b is positioned to the opening 155b of the first portion 154b of the low speed valve chamber 154b, the more the first end 168, specifically the conical portion 172, cylindrical portion 173, and face 174, restrict flow through the low speed fluid chamber 154b from the second chamber passage 144 to the third shared passage 146.

In some examples, the shoulder 176 limits the movement of the valve body 160a, 160b within the low speed fluid chamber 152a, 152b. Specifically, at least the radiused portion 187 can be positioned to make contact with the opening 155a, 155b of the first portion 154a, 154b in order to prevent fluid flow between the first chamber passage 142/second chamber passage 144 and the third shared passage 146, thereby forming a seal. In some examples, the ring portion 189 of the first end 168 has a slip fit connection with the first portion 154a, 154b of the low speed fluid chamber 152a, 152b. In some examples, the slip flit is between a G7/h6 and a F8/h7 slip fit. In some examples, the valve body 160*a*, 160*b* will allow fluid flow between the first chamber passage 142/second chamber passage 144 and the third shared passage 146 when the ring portion 189 is positioned within the opening 155*a*, 155*b* of the first portion 154*a*, 154*b* and the radiused portion 187 is not in contact with the opening 155*a*, 155*b*.

Figure 19:
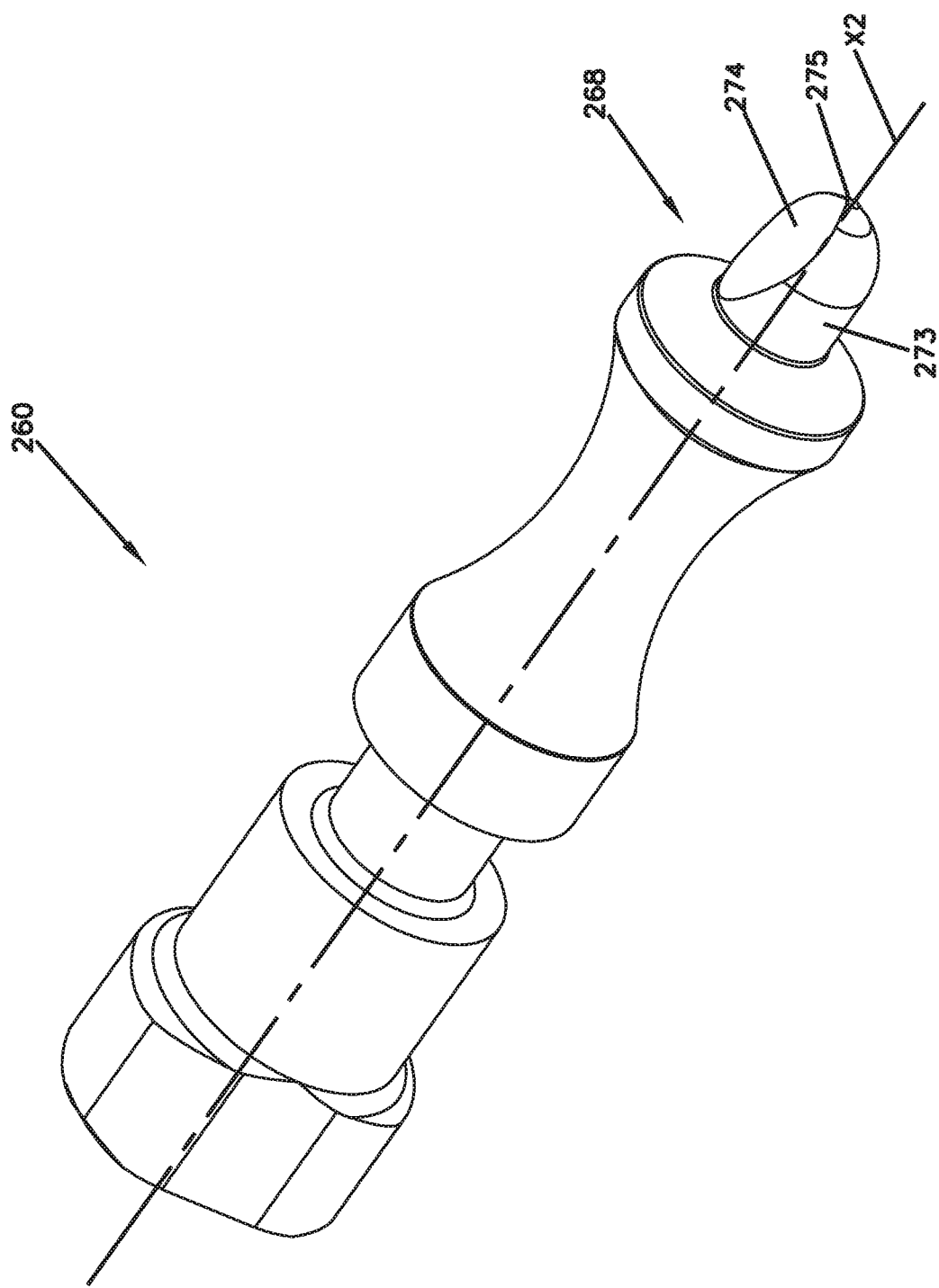
FIG. 19 illustrates a perspective view of a low speed valve body, according to one embodiment of the present disclosure.
Figure 20:
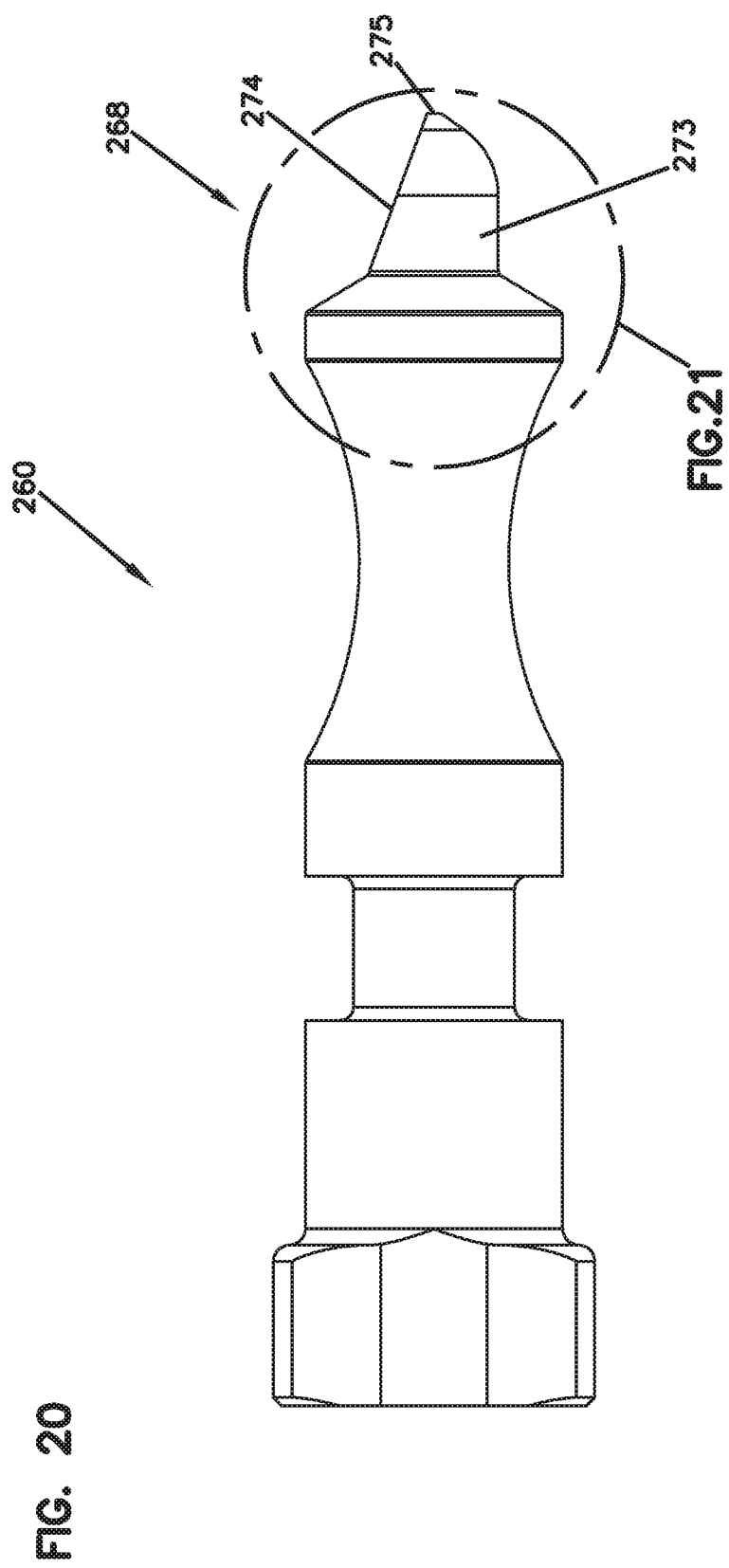
FIG. 20 illustrates a side view of the low speed valve body of FIG. 19.
Figure 21:
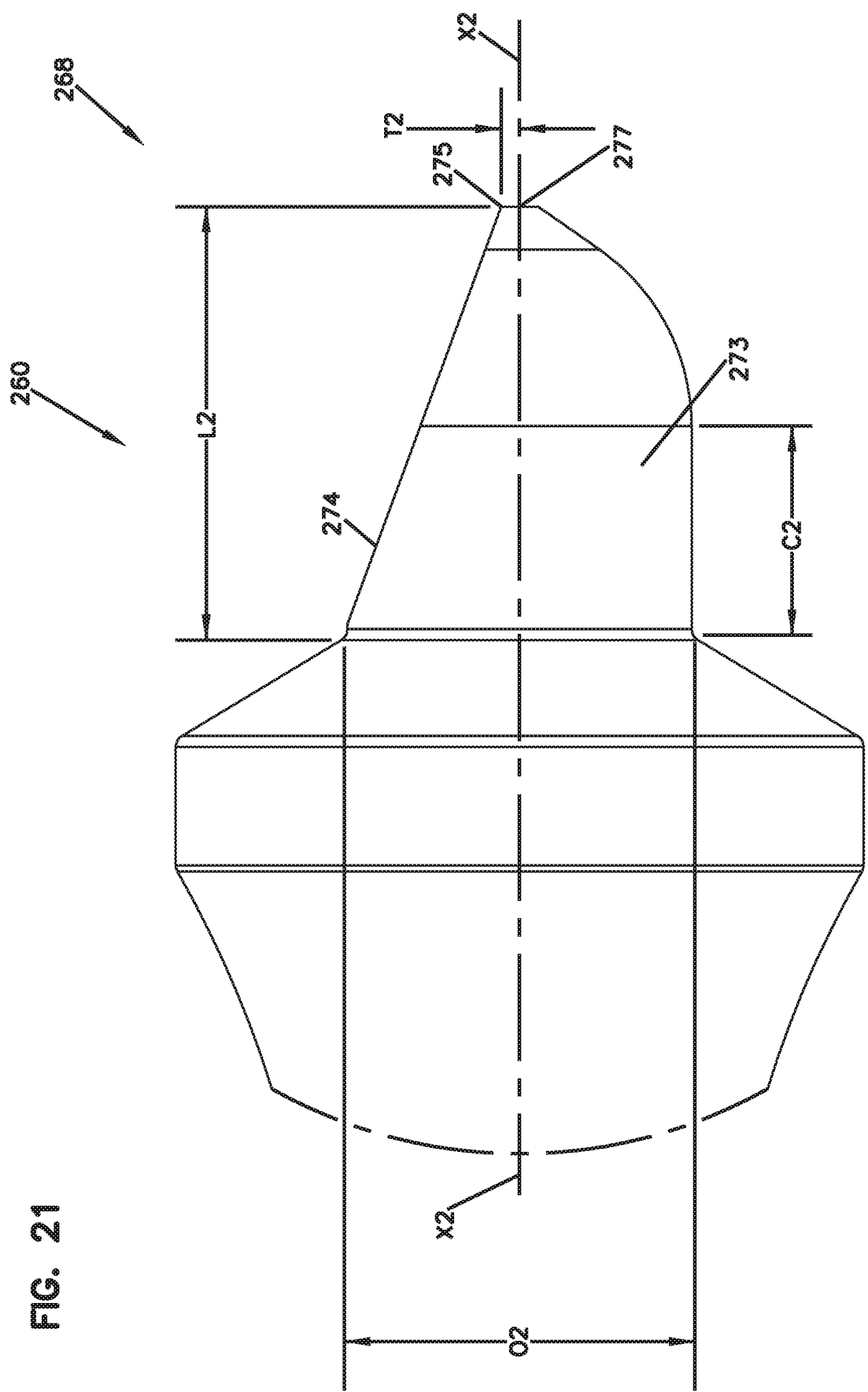
FIG. 21 illustrates a zoomed-in view of a first end of the low speed valve body of FIG. 20.

FIGS. 19-21 show another example of a valve body 260. The valve body 260 is substantially similar to the valve body 160 disclosed above, including a face 274. In some examples, the configuration of a first end 268 can be determined by the diameter of an orifice O2 and an amount of valve movement allowed L2. Like the valve body 160 described above, the diameter of the orifice O2 corresponds to the width W1 of the first portion 154*a*, 154*b* of the low speed fluid chamber 152*a*, 152*b*.

In some examples, an axial width C2 of a cylindrical portion 273 is given by $$C2 = 0.75 \times L2$$

In the depicted example, a valve body tip 275 is defined where the face 274 meets a forward-most end face 277. The tip 275 is offset from a longitudinal axis X2 a distance T2. The distance T2 is offset above the longitudinal axis X2. In some examples, T is given by $$T2 = 0.01 \times O2$$

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

We claim:

1. A valve portion comprising:
   a body having a longitudinal axis, the body including:
     a conical portion positioned at an end of the body, the conical portion at least partially surrounding the body; and
     a planar face circumferentially adjacent the conical portion, the planar face being angled with respect to the longitudinal axis of the body.

2. The valve portion of claim 1, further comprising a circumferential shoulder defined by the body, the shoulder having an outer diameter, the conical portion being axially adjacent the shoulder.

3. The valve portion of claim 2, wherein the conical portion has a maximum outer diameter less than or equal to the outer diameter of the shoulder.

4. The valve portion of claim 2, wherein the planar face is axially adjacent the shoulder.

5. The valve portion of claim 1, wherein the conical portion and planar face at least partially define a valve body tip.

6. The valve portion of claim 1, further comprising a tapered section axially adjacent the conical portion, the tapered section having a first end, a second end, and a middle portion positioned between the first and second ends, wherein the tapered section has an outer diameter that decreases from the first end toward the middle portion and also decreases from the second end toward the middle portion.

7. The valve portion of claim 1, wherein the valve body is sized and shaped to be positioned within a valve chamber.

8. The valve portion of claim 7, wherein the valve body is movable within the valve chamber.

9. The valve portion of claim 7, wherein the valve chamber is a valve chamber of a shock absorber.

10. The valve portion of claim 7, wherein the conical portion has a maximum outer diameter less than the inner diameter of the valve chamber.

11. The valve portion of claim 7, further comprising a circumferential shoulder defined by the body, the shoulder having an outer diameter, wherein the conical portion is axially adjacent the shoulder, wherein the circumferential shoulder has a maximum outer diameter greater than the inner diameter of at least a portion of the valve chamber.

12. The valve portion of claim 1, wherein the conical portion has at least one curved side.

13. The valve portion of claim 1, wherein the conical portion has a tapered configuration.

14. A valve portion comprising:
    a body having a longitudinal axis, the body including:
      a circumferential shoulder defined by the body, the shoulder having an outer diameter;
      a conical portion at least partially surrounding the body axially adjacent the shoulder, the conical portion at least partially defining a valve body tip, the conical portion having a maximum outer diameter less than or equal to the outer diameter of the shoulder; and
      a planar face circumferentially adjacent the conical portion and axially adjacent the shoulder, the planar face being angled with respect to the longitudinal axis of the body, wherein the planar face at least partially defines the valve body tip.

15. The valve portion of claim 14, wherein the valve body is sized and shaped to be positioned within a valve chamber.

16. The valve portion of claim 15, wherein the valve body is movable within the valve chamber.

17. The valve portion of claim 15, wherein the valve chamber is a valve chamber of a shock absorber.

18. The valve portion of claim 14, wherein the conical portion has at least one curved side.

19. The valve portion of claim 14, wherein the conical portion has a tapered configuration.

20. A valve system for a shock absorber comprising:
    a valve chamber body including:
      a valve chamber for receiving a valve, the valve chamber connecting a first passage and a return passage, the valve including:
        a body having a longitudinal axis, the body including:
          a conical portion positioned at a first end of the body, the conical portion at least partially surrounding the body; and
          a planar face circumferentially adjacent the conical portion, the planar face being angled with respect to the longitudinal axis of the body, wherein the position of the valve within the valve chamber controls the flow of fluid between the first and return passages via the valve chamber.

21. The valve system of claim 20, wherein the valve body is movably positioned within the valve chamber.

22. The valve system of claim 21, wherein the position of the valve within the valve chamber is adjustable via an adjustment device in communication with the valve body.

23. The valve system of claim 22, wherein the adjustment device is fixed to the valve body at a second end, opposite the first end, and wherein the adjustment device is movably secured to the valve chamber body.

24. The valve system of claim 22, wherein the adjustment device is movably secured to the valve chamber body via a threaded interface.

25. The valve system of claim 20, wherein the valve chamber body is a shock absorber manifold, the first and return passages of the shock absorber manifold being in fluid communication with at least one shock absorber tube having a piston movably positioned therein.

26. The valve system of claim 20, wherein the valve is a first valve, wherein the valve chamber body further comprises a second valve chamber, the second valve chamber connecting a second passage and the return passage, the second valve chamber including a second valve, the second valve including:
   a second valve body having a longitudinal axis;
   the second valve body including:
      a second valve conical portion positioned at an end of the body, the second valve conical portion at least partially surrounding the second valve body; and
      a second valve planar face circumferentially adjacent the second valve conical portion, the second valve planar face being angled with respect to the longitudinal axis of the second valve body, wherein the position of the second valve within the second valve chamber controls the flow of fluid between the second and return passages via the second valve chamber.

27. The valve system of claim 26, wherein the valve chamber body is a shock absorber manifold of a shock absorber, the shock absorber including:
   a tube having an interior volume;
   a piston being movably positioned within the interior volume, wherein the piston divides the interior volume into a first chamber and a second chamber;
   the first passage being in communication with the first chamber,
   the second passage being in communication with the second chamber;
   the return passage being selectively in fluid communication with the first and second passages via the first and second valves and selectively in communication with the first and second chambers.

28. The valve system of claim 27, wherein the tube is an inner tube, and wherein the shock absorber further comprises an outer tube surrounding the inner tube, wherein the inner and outer tubes define an annular passageway disposed therebetween, the annular passageway being in communication with the second chamber of the interior volume of the inner tube.

29. The valve system of claim 20, wherein the conical portion has at least one curved side.

30. The valve system of claim 20, wherein the conical portion has a tapered configuration.

* * * * *